(12) United States Patent
Kusakabe et al.

(10) Patent No.: US 7,376,973 B2
(45) Date of Patent: May 20, 2008

(54) DATA STORAGE APPARATUS

(75) Inventors: Susumu Kusakabe, Kanagawa (JP); Tadashi Morita, Aichi (JP); Masachika Sasaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 645 days.

(21) Appl. No.: 10/296,124

(22) PCT Filed: Mar. 28, 2002

(86) PCT No.: PCT/JP02/03031

§ 371 (c)(1),
(2), (4) Date: Aug. 27, 2003

(87) PCT Pub. No.: WO02/082279

PCT Pub. Date: Oct. 17, 2002

(65) Prior Publication Data

US 2004/0049646 A1 Mar. 11, 2004

(30) Foreign Application Priority Data

Mar. 30, 2001 (JP) .............................. 2001-98780

(51) Int. Cl.
G06F 17/30 (2006.01)
(52) U.S. Cl. .................. 726/27; 711/115; 711/164; 726/4; 713/193
(58) Field of Classification Search ............... 713/157, 713/167, 190, 193; 380/228, 281, 28; 726/27, 726/28, 30, 4; 711/115, 164
See application file for complete search history.

(56) References Cited

U.S. PATENT DOCUMENTS 5,544,246 A 8/1996 Mandelbaum et al.
(Continued)

FOREIGN PATENT DOCUMENTS

EP 0 644 513 3/1995

(Continued)

OTHER PUBLICATIONS

JAVA Card Applet Developer's Guide Revision 1.12, Sun Microsystems, Inc., Aug. 19, 1998, Chapter 5.

(Continued)

Primary Examiner—Nasser Moazzami
Assistant Examiner—Shanto M Z Abedin
(74) Attorney, Agent, or Firm—Finnegan, Henderson, Farabow, Garrett, & Dunner, L.L.P.

(57) ABSTRACT

The present invention relates to an information processing apparatus that allows separately forming regions having different roles. When an area definition region #0100h is newly formed under an area definition region #0000h that is formed on an IC card, information of the area definition region #0100h is encrypted using a service key stored in an area registration service definition region #0020h that is formed in advance, and the encrypted information is supplied to the IC card. Upon receiving that information, the IC card decrypts the encrypted information using the service key stored in the area registration service definition region #0020h. Then, the area definition region #0100h is formed based on the result of decryption. The present invention may be applied to an IC card that exchanges information in a non-contact manner and to an apparatus that exchanges data with the IC card.

6 Claims, 17 Drawing Sheets

U.S. PATENT DOCUMENTS

| | | | | |
|---|---|---|---|---|
| 6,708,157 | B2 * | 3/2004 | Stefik et al. | 705/59 |
| 6,792,541 | B1 * | 9/2004 | Kusakabe et al. | 726/1 |
| 7,003,671 | B1 * | 2/2006 | Kusakabe et al. | 713/189 |
| 2003/0188117 | A1 * | 10/2003 | Yoshino et al. | 711/164 |

FOREIGN PATENT DOCUMENTS

| | | |
|---|---|---|
| EP | 0 973 135 | 1/2000 |
| EP | 0 973 136 | 1/2000 |
| EP | 0973135 A2 * | 1/2000 |
| JP | 7-152837 | 6/1995 |
| JP | 9-319848 | 12/1997 |
| JP | 2000-36014 | 2/2000 |
| JP | 2000-36021 | 2/2000 |
| JP | 2000-155715 | 6/2000 |

OTHER PUBLICATIONS

JICSAP IC Card SHIYO V2.0 DA13BU Kyotsu Command, IC Card System RIYO Sokushin Kyogikai, Jul. 2001, pp. 26 to 47.
Supplementary European Search Report from European Patent Office dated Apr. 10, 2007, for Application No.: 02707199.2—2212 PCT/JP0203031, 3 pages.

* cited by examiner

NEWLY CREATED REGION

NEWLY CREATED REGION

DATA STORAGE APPARATUS

TECHNICAL FIELD

The present invention relates to data storage apparatuses, and more specifically, it relates to a data storage apparatus that allows addition and alteration of administration information for administering an internal memory of, for example, an IC card while preventing tampering, without collecting the IC card.

BACKGROUND ART

IC (Integrated Circuit) cards (smart cards), which are expected to be used, for example, in electronic money systems and security systems, are being developed.

An IC card includes a CPU for executing various processes and a memory for storing data, etc. required for the processes, and it exchanges data in electrical contact with a predetermined reader/writer (R/W) or in a non-contact manner using electromagnetic waves. In IC cards that exchange data with the R/W in a non-contact manner using electromagnetic waves, generally, required electric power is supplied by the electromagnetic waves.

When an IC card is used, for example, in an electronic money system or a security system, security issues such as secrecy of data and prevention of forging of the IC card are essential, so that, generally, access to the IC card is allowed using a key assigned by an administrator (operator) of the system. That is, access to the IC card by a person without the key is restricted.

Furthermore, security is dictated in, for example, ISO (International Organization for Standardizaion) 7816, which defines standards for contact-type IC cards. According thereto, by applying a key to a DF (Dedicated File) that corresponds to a directory or a folder, access to DFs and EFs (Elementary Files), which correspond to files, that belongs to the layer of the DF is restricted.

Generally, what is called ticketing, which is executed for newly adding to an IC card a file for storing data for providing a new service or for changing a key required for accessing data, is generally executed at a facility or the like with adequate security management after an administrator or a manufacturer of the IC card collects the IC card issued to a user and on the market.

That is, generally, for example, an issuing agent executes primary issuing of an IC card, issuing an IC card without functions (IC card that does not allow reading or writing) to a ticketing agent that executes ticketing, as shown in FIG. 1. The ticketing agent executes ticketing (secondary issuing) so that an administrator #1 that wishes to provide a service using the IC card is allowed to use the IC card.

That is, the ticketing agent allocates a storage region to be used by the administrator #1 (a region of the administrator #1) in the IC card, and writes a key and other information that is required for the administrator #1 to access the storage region. Ticketing is executed at a place with adequate security management (hereinafter referred to as a secure place when appropriate) such as a facility of the ticketing agent. Referring to FIG. 1, the ticketing agent and the administrator #1 are typically the same entity.

The IC card that has undergone ticketing is shipped to the market and distributed to a user. Then, it is used for the administrator #1 to provide a service. That is, this allows the user to use the IC card as, for example, an electronic commuter pass or wallet.

For example, if the IC card that is now on the market supports multiple functions and if an administrator #2 other than the administrator #1 wishes to provide a service using the multi-function IC card, the ticketing agent temporarily collects the IC card on the market, as shown in FIG. 2.

Then, the ticketing agent executes ticketing so that the administrator #2 is allowed to use the IC card. That is, the ticketing agent allocates a storage region to be used by the administrator #2 (a region of the administrator #2) in the IC card, and writes a key and other information required for the administrator #2 to access the storage region. Then, the IC card that has undergone ticketing is shipped to the market again.

The key, etc. that is written to the IC card by ticketing is essential information for security of the IC card. It is undesirable to distribute such information to a place without security management (hereinafter referred to as an insecure place when appropriate) such as the market, where probability of unjust acts such as eavesdropping and tampering is high. Thus, ticketing is executed at a secure place after collecting the IC card from the market, as described above.

Thus, the IC card must be collected each time ticketing is to be executed, which is laborious. In order to overcome the above, the applicant has proposed earlier, in Japanese Unexamined Patent Application Publication No. 10-201497, a method of ticketing in which administration information including a key required for accessing a storage region is encrypted so that leakage of content of the administration information to a third party will be prevented.

Now, storage regions will be described with reference to FIG. 3. Storage regions consist mainly of area regions and service regions. An area region is allocated to each administrator, and a service region is allocated to a service provided by an administrator that administers an area region.

According to the method disclosed in Japanese Unexamined Patent Application Publication No. 10-201497, allocation of storage regions is such that both area regions and service regions are assigned, so that an assignee administrator is allowed to provide a number of area regions and service regions. Thus, an administrator to which a predetermined storage region is assigned is allowed to let yet another administrator provide area regions and service regions in the storage region under its own administration.

This indicates that a problem has existed that it is impossible to separate rights for registering service regions and area regions, that is, it is impossible to separately assign right to register service regions and right to register area regions.

DISCLOSURE OF INVENTION

The present invention has been made in view of the above situation, and an object thereof is to allow separate registration of an area region and a service region by separately providing a region required for registration of the area region and a region required for registration of the service region.

A data storage apparatus according to the present invention comprises storage means in which at least one of a first region administered by a first administrator, a second region for administering information relating to a service, a third region, a parent thereof being the first region, for administering information required for forming a region, an upper layer thereof being the first region, that is administered by a second administrator, and a fourth region, a parent thereof being the first region, for administering information required for forming the second region is formed; reception means for receiving a request for forming one of the first to fourth regions, and information relating to the region associated with the forming request, at least a portion of the information being encrypted; reading means for reading from the storage means, based on the information received by the reception means, a key stored in a region that serves as a parent of the region associated with the forming request among the first to fourth regions; decryption means for decrypting the encrypted information using the key read by the reading means; and forming means for forming the region associated with the forming request in the storage means based on the information decrypted by the decryption means.

A data storage method according to the present invention comprises a reception control step of controlling reception of a request to a data storage medium in which at least one of a first region administered by a first administrator, a second region for administering information relating to a service, a third region, a parent thereof being the first region, for administering information required for forming a region, an upper layer thereof being the first region, that is administered by a second administrator, and a fourth region, a parent thereof being the first region, for administering information required for forming the second region is formed, the request being for forming one of the first to fourth regions, and reception of information relating to the region associated with the forming request, at least a portion of the information being encrypted; a reading step of reading from a region of the data storage medium, based on the information received under control by the process of the reception control step, a key stored in a region that serves as a parent of the region associated with the forming request among the first to fourth regions; a decryption step of decrypting the encrypted information using the key read by the process of the reading step; and a forming step of forming the region associated with the forming request in the data storage medium based on the information decrypted by the process of the decryption step.

A program of a first recording medium according to the present invention comprises a reception control step of controlling reception of a request to a data storage medium in which at least one of a first region administered by a first administrator, a second region for administering information relating to a service, a third region, a parent thereof being the first region, for administering information required for forming a region, an upper layer thereof being the first region, that is administered by a second administrator, and a fourth region, a parent thereof being the first region, for administering information required for forming the second region is formed, the request being for forming one of the first to fourth regions, and reception of information relating to the region associated with the forming request, at least a portion of the information being encrypted; a reading step of reading from a region of the data storage medium, based on the information received under control by the process of the reception control step, a key stored in a region that serves as a parent of the region associated with the forming request among the first to fourth regions; a decryption step of decrypting the encrypted information using the key read by the process of the reading step; and a forming step of forming the region associated with the forming request in the data storage medium based on the information decrypted by the process of the decryption step.

A first program according to the present invention allows a computer to execute a reception control step of controlling reception of a request to a data storage medium in which at least one of a first region administered by a first administrator, a second region for administering information relating to a service, a third region, a parent thereof being the first region, for administering information required for forming a region, an upper layer thereof being the first region, that is administered by a second administrator, and a fourth region, a parent thereof being the first region, for administering information required for forming the second region is formed, the request being for forming one of the first to fourth regions, and reception of information relating to the region associated with the forming request, at least a portion of the information being encrypted; a reading step of reading from a region of the data storage medium, based on the information received under control by the process of the reception control step, a key stored in a region that serves as a parent of the region associated with the forming request among the first to fourth regions; a decryption step of decrypting the encrypted information using the key read by the process of the reading step; and a forming step of forming the region associated with the forming request in the data storage medium based on the information decrypted by the process of the decryption step.

An information processing apparatus according to the present invention comprises encryption means for encrypting information of a second region using a key administered by a fourth region when requesting formation of the second region, encrypting information of a region administered by a second administrator using a key administered by a third region when requesting formation of the region administered by the second administrator in a region administered by a first administrator, encrypting information of the third region using a key administered by a first region when requesting formation of the third region, and encrypting information of the fourth region using a key administered by the first region when requesting formation of the fourth region; and providing means for providing the information encrypted by the encryption means to a data storage medium.

An information processing method comprises an encryption step of encrypting information of a second region using a key administered by a fourth region when requesting formation of the second region, encrypting information of a region administered by a second administrator using a key administered by a third region when requesting formation of the region administered by the second administrator to a region administered by a first administrator, encrypting information of the third region using a key administered by a first region when requesting formation of the third region, and encrypting information of the fourth region using a key administered by the first region when requesting formation of the fourth region; and a providing step of providing the information encrypted by the process of the encryption step to the data storage medium.

A program of a second recording medium according to the present invention comprises an encryption step of encrypting information of a second region using a key administered by a fourth region when requesting formation of the second region, encrypting information of a region administered by a second administrator using a key administered by a third region when requesting formation of the region administered by the second administrator to a region administered by a first administrator, encrypting information of the third region using a key administered by a first region when requesting formation of the third region, and encrypting information of the fourth region using a key administered by the first region when requesting formation of the fourth region; and a providing step of providing the information encrypted by the process of the encryption step to the data storage medium.

A second program according to the present invention allows a computer that controls an information processing apparatus to execute an encryption step of encrypting information of a second region using a key administered by a fourth region when requesting formation of the second region, encrypting information of a region administered by a second administrator using a key administered by a third region when requesting formation of the region administered by the second administrator in a region administered by a first administrator, encrypting information of the third region using a key administered by a first region when requesting formation of the third region, and encrypting information of the fourth region using a key administered by the first region when requesting formation of the fourth region; and a providing step of providing the information encrypted by the process of the encryption step to the data storage medium.

According to a data storage apparatus and method and a first program of the present invention, a first region administered by a first administrator is formed, and also, at least one of a second region for administering information relating to a service, a third region, a parent thereof being the first region, for administering information required for forming a region that is administered by a second administrator, and a fourth region, a parent thereof being the first region, for administering information required for forming the second region is formed, a key stored in a region that serves as a parent of the region associated with the forming request among the first to fourth regions is read, and encrypted information received is decrypted using the key that has been read.

According to an information processing apparatus and method and a second program of the present invention, information of a second region is encrypted using a key administered by a fourth region when requesting formation of the second region, information of a region administered by a second administrator is encrypted using a key administered by a third region when requesting formation of the region administered by the second administrator to a region administered by a first administrator, information of the third region is encrypted using a key administered by a first region when requesting formation of the third region, and information of the fourth region is encrypted using a key administered by the first region when requesting formation of the fourth region, and the encrypted information is provided to a data storage medium.

BEST MODE FOR CARRYING OUT THE INVENTION

Figure 4:
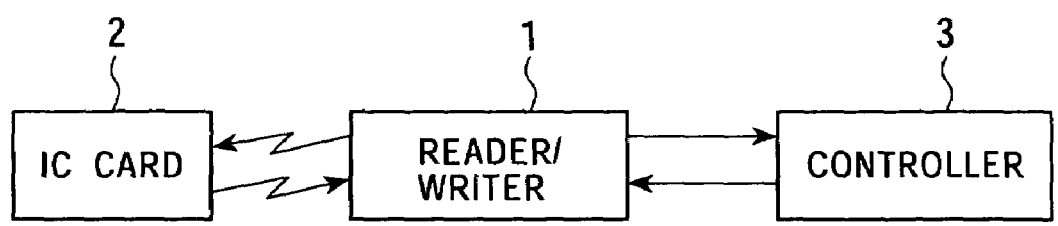
FIG. 4 is a block diagram showing an example construction of a card system that uses an IC card, according to an embodiment of the present invention.

Embodiments of the present invention will now be described with reference to the drawings. FIG. 4 shows an example construction of a non-contact card system (a system refers to a logical assembly of a plurality of apparatuses, irrespective of whether the constituent apparatuses are within the same case) that uses an IC card, according to an embodiment of the present invention.

The non-contact card system includes an R/W (reader/writer) 1, an IC card 2, and a controller 3, and data is exchanged between the R/W 1 and the IC card 2 in a non-contact manner using electromagnetic waves. More specifically, the R/W 1 transmits a predetermined command to the IC card 2, and the IC card 2 receives the command and executes a process corresponding to the command. The IC card 2 then generates response data corresponding to the processing result, and transmits the response data to the R/W 1.

The R/W 1 is connected to the controller 3 via a predetermined interface (e.g., an interface compliant with the RS-485A standard), and the controller 3 supplies a predetermined control signal to the R/W 1 so that a predetermined process will be executed.

Figure 5:
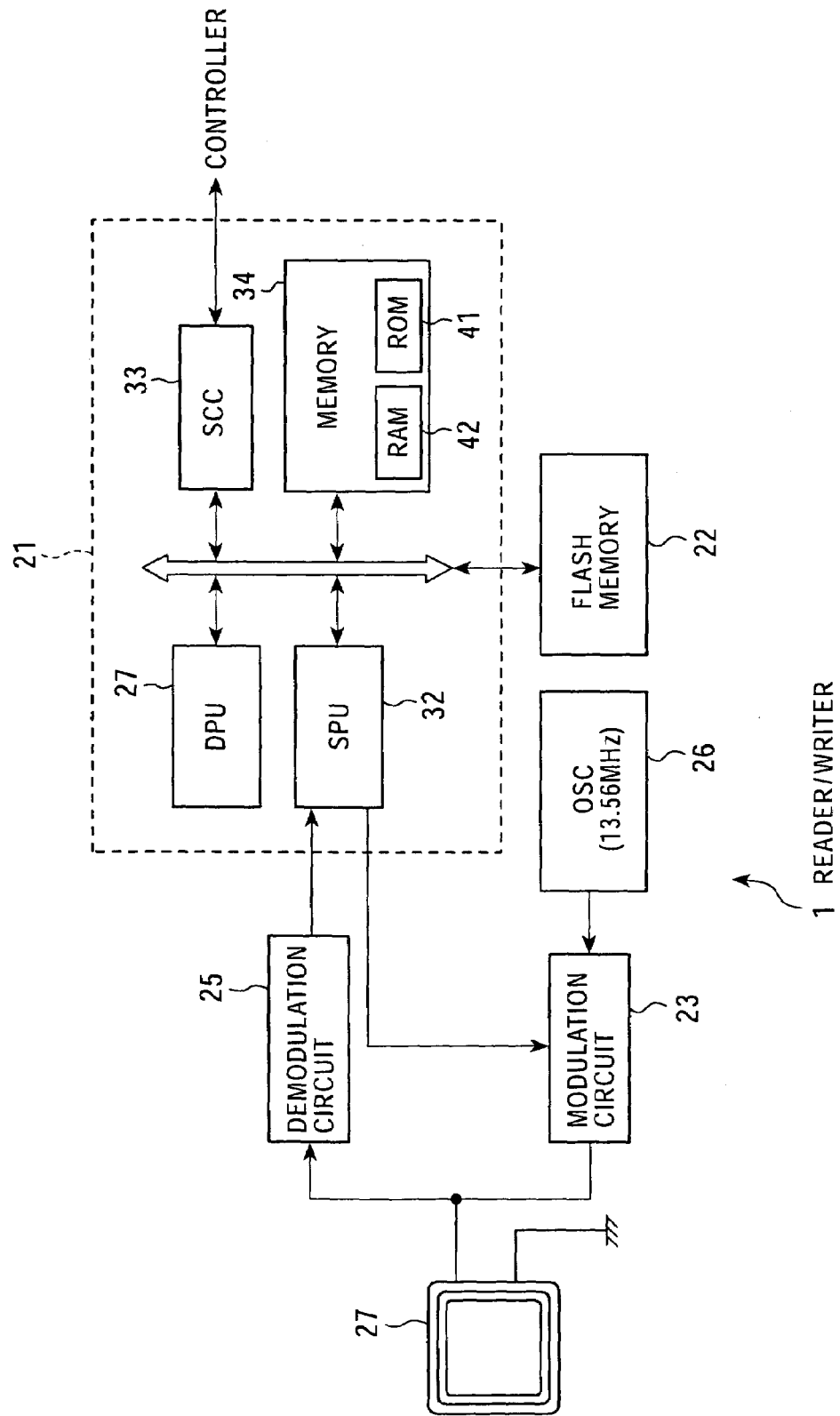
FIG. 5 is a block diagram showing an example construction of a reader/writer 1 shown in FIG. 4.

FIG. 5 shows an example construction of the R/W 1 shown in FIG. 4. In an IC 21, a DPU (Data Processing Unit) 31 for processing data, an SPU (Signal Processing Unit) 32 for processing data to be transmitted to the IC card 2 and data received from the IC card 2, an SCC (Serial Communication Controller) 33 for executing communications with the controller 3, and a memory 34 including a ROM (Read Only Memory) 41 that prestores information that is required for processing data and a RAM (Random Access Memory) 42 for temporarily storing data in the course of processing are connected via a bus.

Furthermore, a flash memory 22 for storing predetermined data is connected to the bus. The DPU 31 outputs to the SPU 32 a command to be transmitted to the IC card 2, and receives from the SPU 32 response data received from the IC card 2. The SPU 32 executes a predetermined process (e.g., BPSK (BiPhase Shift Keying) modulation (coding into Manchester code)) on the command to be transmitted to the IC card 2, outputting the result to a modulation circuit 23, and receives from a demodulation circuit 25 the response data transmitted from the IC card 2, executing a predetermined process on the data.

The modulation circuit 23 ASK (Amplitude Shift Keying)-modulates a carrier wave having a predetermined frequency (e.g., 13.56 MHz), supplied from an oscillator (OSC) 26, with the data supplied from the SPU 32, outputting a modulated wave thus generated to the IC card 2 via an antenna 27 in the form of an electromagnetic wave. At this time, the modulation circuit 23 executes ASK modulation with a modulation degree below one. Accordingly, the maximum amplitude of the modulated wave does not become zero even if the data is at low level.

The demodulation circuit 25 demodulates a modulated wave (ASK-modulated wave) received via the antenna 27, outputting demodulated data to the SPU 32.

Figure 6:
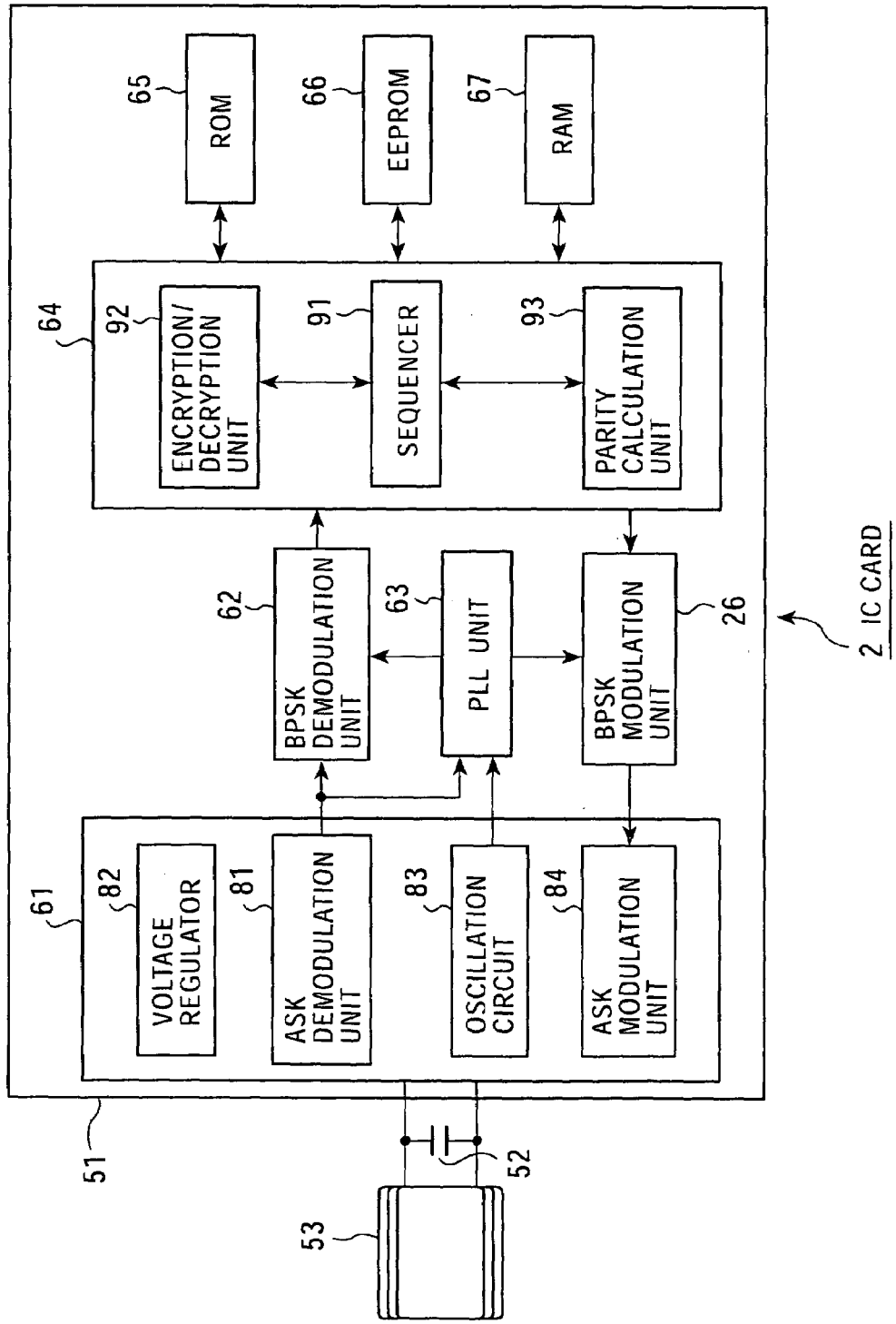
FIG. 6 is a block diagram showing an example construction of an IC card 2 shown in FIG. 4.

FIG. 6 shows an example construction of the IC card 2 shown in FIG. 4. In the IC card 2, an IC 51 receives, via an antenna 53, a modulated wave transmitted from the R/W 1. A capacitor 52 constitutes an LC circuit together with the antenna 53, tuning into (resonating with) an electromagnetic wave having a predetermined frequency (carrier frequency).

In the IC 51, an RF interface unit 61, in an ASK demodulation unit 81, detects and demodulates the modulated wave (ASK-modulated wave) received via the antenna 53, outputting demodulated data to a BPSK demodulation circuit 62 and to a PLL (Phase Locked Loop) unit 63; and the RF interface unit 61, in a voltage regulator 82, stabilizes the signal detected by the ASK demodulation unit 81, supplying the result to each circuit as a DC power supply. Furthermore, the RF interface unit 61, by an oscillation circuit 83, oscillates a signal having the same frequency as a clock frequency of data, outputting the signal to the PLL unit 63.

Furthermore, the RF interface unit 61, in the ASK demodulation unit 81, varies the load of the antenna 53, which serves as a power supply for the IC card 2, in accordance with data supplied from a calculation unit 64 via a BPSK modulation circuit 68 (e.g., a predetermined switching element is turned on/off in accordance with the data so that a predetermined load will be connected in parallel to the antenna 53 only when the switching element is on), thereby ASK-modulating a modulated wave being received via the antenna 53 (the R/W 1 outputs a modulated wave a constant maximum amplitude when data is transmitted from the IC card 2 (when letting the IC card 2 transmit data), and the modulated wave is ASK-modulated by varying the load of the antenna 53), and transmits the modulated component to the R/W 1 via the antenna 53 (varies a terminal voltage of the antenna 27 of the R/W 1).

The PLL unit 63 generates from the data supplied from the ASK demodulation unit 81 a clock signal that is synchronized with the data, outputting the clock signal to the BPSK demodulation circuit 62 and to the BPSK modulation circuit 68.

The BPSK demodulation circuit 62, if the data demodulated by the ASK demodulation unit 81 is BPSK-modulated, demodulates the data (decodes Manchester code) based on the clock signal supplied from the PLL unit 63, outputting demodulated data to the calculation unit 64.

The calculation unit 64, if the data supplied from the BPSK demodulation circuit 62 is encrypted, decrypts the data in an encryption/decryption unit 92, and processes the data in a sequencer 91. If the data is not encrypted, the data supplied from the BPSK demodulation circuit 62 is supplied directly to the sequencer 91 without passing through the encryption/decryption unit 92.

The sequencer 91 executes a process corresponding to the data supplied thereto as a command. More specifically, for example, the sequencer 91 executes writing and reading of data to and from an EEPROM (Electrically Erasable and Programmable ROM) 66, required operations on data, etc. Furthermore, the sequencer 91 controls access to the EEPROM 66 by authentication, manages the EEPROM 66, etc.

A parity calculation unit 93 of the calculation unit 64 calculates data to be stored in the EEPROM 66 and, for example, a Reed-Solomon code as a parity from data stored in the EEPROM 66.

Furthermore, the calculation unit 64 executes a predetermined process in the sequencer 91, and then outputs response data (data to be transmitted to the R/W 1) corresponding to the process to the BPSK modulation circuit 68. The BPSK modulation circuit 68 BPSK-modulates the data supplied from the calculation unit 64, outputting modulated data to an ASK modulation unit 84 of the RF interface unit 61.

A ROM 65 stores a program and other data necessary for processing by the sequencer 91. A RAM 67 temporarily stores data in the course of processing by the sequencer 91. The EEPROM 66 is a non-volatile memory, and it keeps data stored even after the IC card 2 exits communication with the R/W 1 and supply of power is stopped.

Next, a process of exchanging data between the R/W 1 and the IC card 2 will be described. The R/W 1 (FIG. 5) radiates a predetermined electromagnetic wave from the antenna 27 to monitor load status of the antenna 27, and waits until change in load status due to the IC card 2 approaching is detected. Alternatively, the R/W 1 may execute a process (polling) of repeatedly radiating an electromagnetic wave that is ASK-modulated with data having a predetermined short pattern to call the IC card 2 until a response from the IC card 2 is received within a predetermined period.

In the R/W 1, when an approach of the IC card 2 is detected, the SPU 32 of the R/W 1 BPSK-modulates a carrier wave that is a rectangular wave having a predetermined frequency (e.g., a frequency that is double the clock frequency of data) with data to be transmitted to the IC card 2 (a command corresponding to a process to be executed by the IC card 2, data to be written to the IC card 2, etc.), outputting a modulated wave (BPSK-modulated signal) (Manchester code) thus generated to the modulation circuit 23.

When BPSK modulation is executed, data can be associated with change in the phase of the modulated wave by differential modulation. In that case, even if the BPSK-modulated signal is inverted, demodulation yields the original data, eliminating the need for considering the polarity of the modulated wave at the time of demodulation.

The modulation circuit 23 ASK-modulates a predetermined carrier wave with the input BPSK-modulated signal at a modulation degree (=maximum amplitude of data signal/maximum amplitude of carrier wave) below one (e.g., 0.1), and transmits a modulated wave (ASK-modulated wave) thus generated to the IC card 2 via the antenna 27.

When transmission does not take place, of the two levels of digital signal (high level and low level), the modulation circuit 23 generates a modulated wave using, for example, high level.

In the IC card 2 (FIG. 6), an LC circuit formed of the antenna 53 and the capacitor 52 converts part of the electromagnetic wave radiated by the antenna 27 of the R/W 1 into an electric signal, and the electric signal (modulated wave) is output to the RF interface 61 of the IC 51. Then, the ASK demodulation unit 81 of the RF interface 61 rectifies and smoothes the modulated wave to detect an envelop, supplying a signal thus generated to the voltage regulator 82, and the ASK demodulation unit 81 suppresses DC component of the signal to extract a data signal, supplying the data signal to the BPSK demodulation circuit 62 and to the PLL unit 63.

At this time, a terminal voltage V0 of the antenna 53 is, for example, expressed as follows:

$$V0 = V10(1 + k \times Vs(t)) \cos(\omega t)$$

where $V10 \cos(\omega t)$ denotes carrier wave, k denotes modulation degree, and Vs(t) denotes data output from the SPU 32.

Also, a low-level value VLR of a voltage V1 after rectification by the ASK demodulation unit 81 is, for example, expressed as follows:

$$VLR = V10(1 + k \times (-1)) - Vf$$

where Vf denotes voltage drop across a diode (not shown) constituting a rectifying circuit for rectification and smoothing in the ASK demodulation unit 81, which is generally on the order of 0.7 volts.

The voltage regulator 82 receives a signal that has been rectified and smoothed by the ASK demodulation unit 81, and stabilizes the signal, supplying the result to circuits including the calculation unit 64 as a DC power supply. Since the modulation degree k of the modulated wave herein is below one as described earlier, voltage variation (difference between high level and low level) after rectification is small. Thus, a DC power supply can be readily generated by the voltage generator 82.

Now, for example, if a modulated wave with a modulation degree of 5% is so received that V10 will be three volts or larger, the low level voltage VLR after rectification is 2.15 (=3×(1−0.05)−0.7) volts or larger, so that the voltage regulator 82 supplies a sufficient voltage to each circuit as a power supply. Furthermore, in this case, the amplitude of AC component (data component) of the voltage V1 after rectification, i.e., 2×k×V10 (Peak-to-Peak value), is 0.3 (=2× 0.05×3) volts or larger, so that the ASK demodulation unit 81 is allowed to demodulate data with a sufficiently high S/N ratio.

By using an ASK-modulated wave with a modulation degree below one as described above, communications are executed with low error rate (high S/N ratio), and a sufficient DC voltage is supplied to the IC card 2 as a power supply.

The BPSK demodulation circuit 62 receives the data signal (BPSK-modulated signal) from the ASK demodulation unit 81, and demodulates the data signal based on the clock signal supplied from the PLL unit 63, outputting demodulated data to the calculation unit 64.

The calculation unit 64, if the data supplied from the BPSK demodulation circuit 62 is encrypted, decrypts the data in the encryption/decryption unit 92, and supplies the data (command) to the sequencer 91, where the data is processed. During this period, that is, between when data is transmitted to the IC card 2 and when a response thereto is received, the R/W 1 waits while transmitting data with a value of one. Thus, during this period, the IC card 2 receives a modulated wave with a constant-maximum amplitude.

When processing is complete, the sequencer 91 outputs data relating to the processing result, etc. (data to be transmitted to the R/W 1) to the BPSK modulation circuit 68. The BPSK modulation circuit 68, similarly to the SPU 32 of the R/W 1, BPSK-modulates (coding into Manchester code) the data, outputting the result to the ASK modulation unit 84 of the RF interface unit 61.

The ASK modulation unit 84 varies the load connected between to ends of the antenna 53 in accordance with the data from the BPSK modulation circuit 68 using a switching element or the like, thereby ASK-modulating a modulated wave being received (the maximum amplitude of the modulated wave output by the R/W 1 is constant during transmission of data by the IC card 2 as described earlier) in accordance with data to be transmitted, so that the terminal voltage of the antenna 27 of the R/W 1 is varied, whereby the data is transmitted to the R/W 1.

The modulation circuit 23 of the R/W 1 continuously transmits data with a value of one (high level) while data is being received from the IC card 2. The demodulation circuit 25 detects data transmitted from the IC card 2 on the basis of slight variation (e.g., several tens of microvolts) in the terminal voltage of the antenna 27 electromagnetically coupled to the antenna 53 of the IC card 2.

Furthermore, the demodulation circuit 25 amplifies the detected signal (ASK-modulated wave) by a high-gain amplifier (not shown) and demodulates the result, outputting digital data thus obtained to the SPU 32. The SPU 32 demodulates the data (BPSK-modulated signal), outputting the result to the DPU 31. The DPU 31 processes the data from the SPU 32, determining whether or not to exit communication according to the result of processing. If it is determined that communication be executed again, communication is executed between the R/W 1 and the IC card 2 similarly to the case described above. If it is determined that communication be exited, the R/W 1 exits the communication process with the IC card 2.

As described above, the R/W 1 uses ASK modulation with a modulation degree k below one to transmit data to the IC card 2, and the IC card 2 receives the data and executes a process in accordance with the data, returning data corresponding to the result of processing to the R/W 1.

Figure 7:
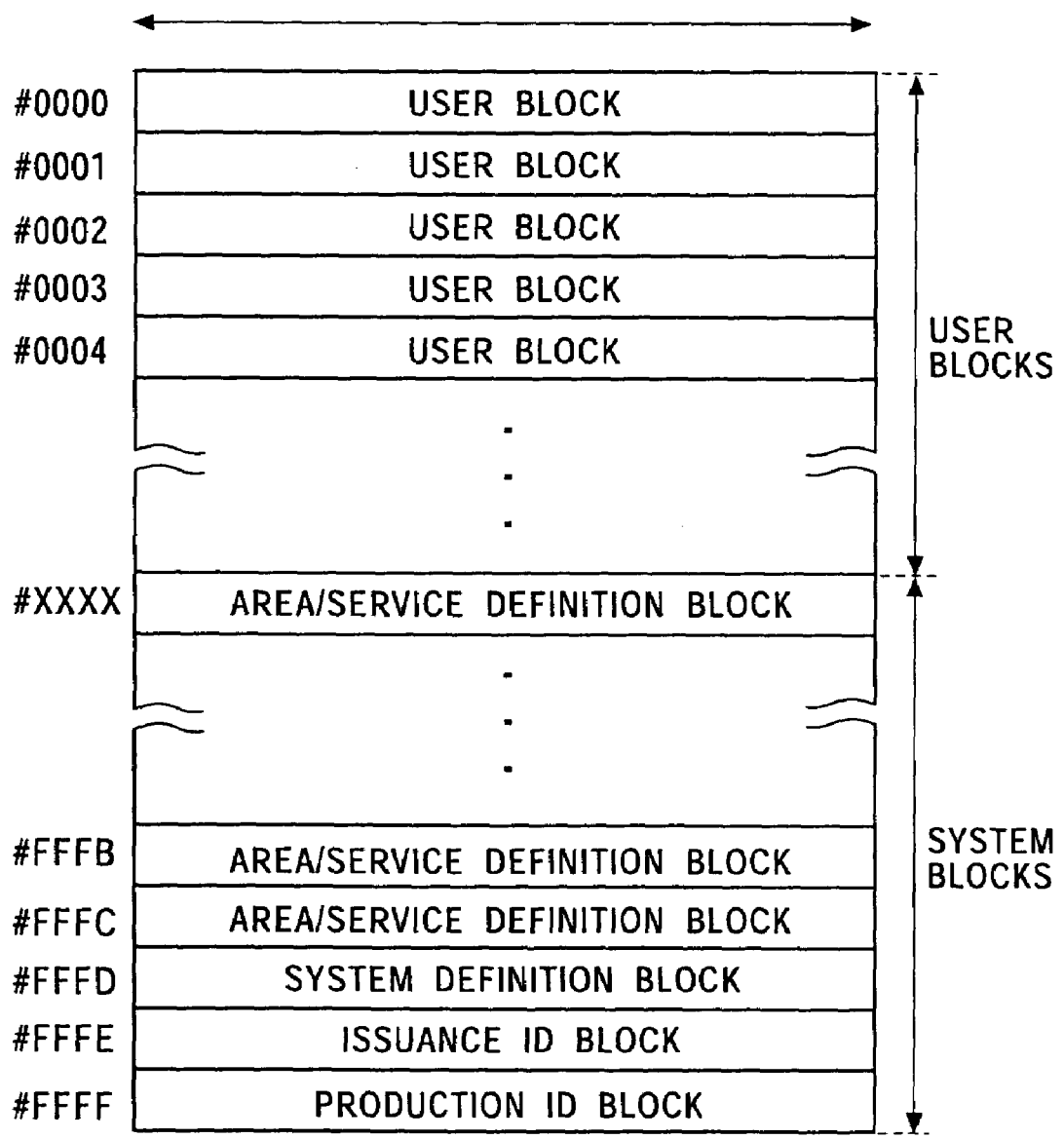
FIG. 7 is a diagram showing a logical format of an EEPROM 66 shown in FIG. 6.

Next, FIG. 7 shows a logical format of the EEPROM 66 shown in FIG. 6. The EEPROM 66 consists of units of block, and in the embodiment shown in FIG. 7, one block consists of, for example, sixteen bytes.

Furthermore, in the embodiment shown in FIG. 7, the logical address of the uppermost block is designated as #0000h (h denotes hexadecimal representation), and logical addresses are assigned in ascending order. In FIG. 7, #0000h to #FFFFh are assigned as logical addresses, thus forming 65,536 ($=2^{16}$) blocks.

A block is used either as a user block or as a system block. Blocks of the EEPROM 66 are assigned to user blocks in ascending order of logical address, and are assigned to system blocks in descending order of logical address. That is, referring to FIG. 7, user blocks grow downward while system blocks grow upward until no empty block is available, at which time no user block or system block can be formed. Thus, the boundary between user blocks and system blocks is not fixed, and no particular limit is imposed on the number of user blocks or on the number of system blocks (however, the total number of user blocks and system blocks is limited to 65,536 at most in the embodiment shown in FIG. 7).

There are seven types of system blocks, namely, a production ID (identification) block, an issuance ID block, a system definition block, an area definition block, a service definition block, an area registration service definition block, and a service registration service definition block. In the embodiment shown in FIG. 7, blocks that serve as an area definition block, a service definition block, an area registration service block, or a service registration definition block are designated as area/service definition blocks.

Of the system blocks, basically, the production ID block, the issuance ID block, and the system definition block are already allocated at the time of issuance of the IC card 2, respectively at logical addresses #FFFFh, #FFFEh, and #FFFDh. The area/service definition blocks are allocated upward from the logical address #FFFCh in order of formation.

In the production ID block, information regarding production of the IC card 2 is allocated. That is, in the production ID block, for example, a unique production ID, year and date of production, a manufacturer code, etc. are allocated.

In the issuance ID block, information regarding issuance of the IC card 2 is allocated. That is, in the issuance ID block, for example, date of issuance of the IC card 2, a code representing order of issuance of the IC card, etc. are allocated.

In the system definition block, for example, the number of system blocks or user blocks in the EEPROM 66, a system key, etc. are allocated. The system key is used when mutual authentication is executed between the IC card 2 and the R/W 1 and the controller 3.

An area definition block is formed, for example, by allocating a storage region (area) to an administrator, and information for the administrator to administer the storage region (area region) allocated to him/herself is allocated therein. That is, in the area definition block, code range, remaining capacity, area key, etc., which will be described later, are allocated.

In a service definition block, information for administering a service region (capacity, service key, etc. of the service region), which will be described later, is allocated.

In an area registration service definition block and a service registration service definition block, information required for forming a new area region and a new service region (a service code and a service key), respectively, is allocated.

Figure 8:
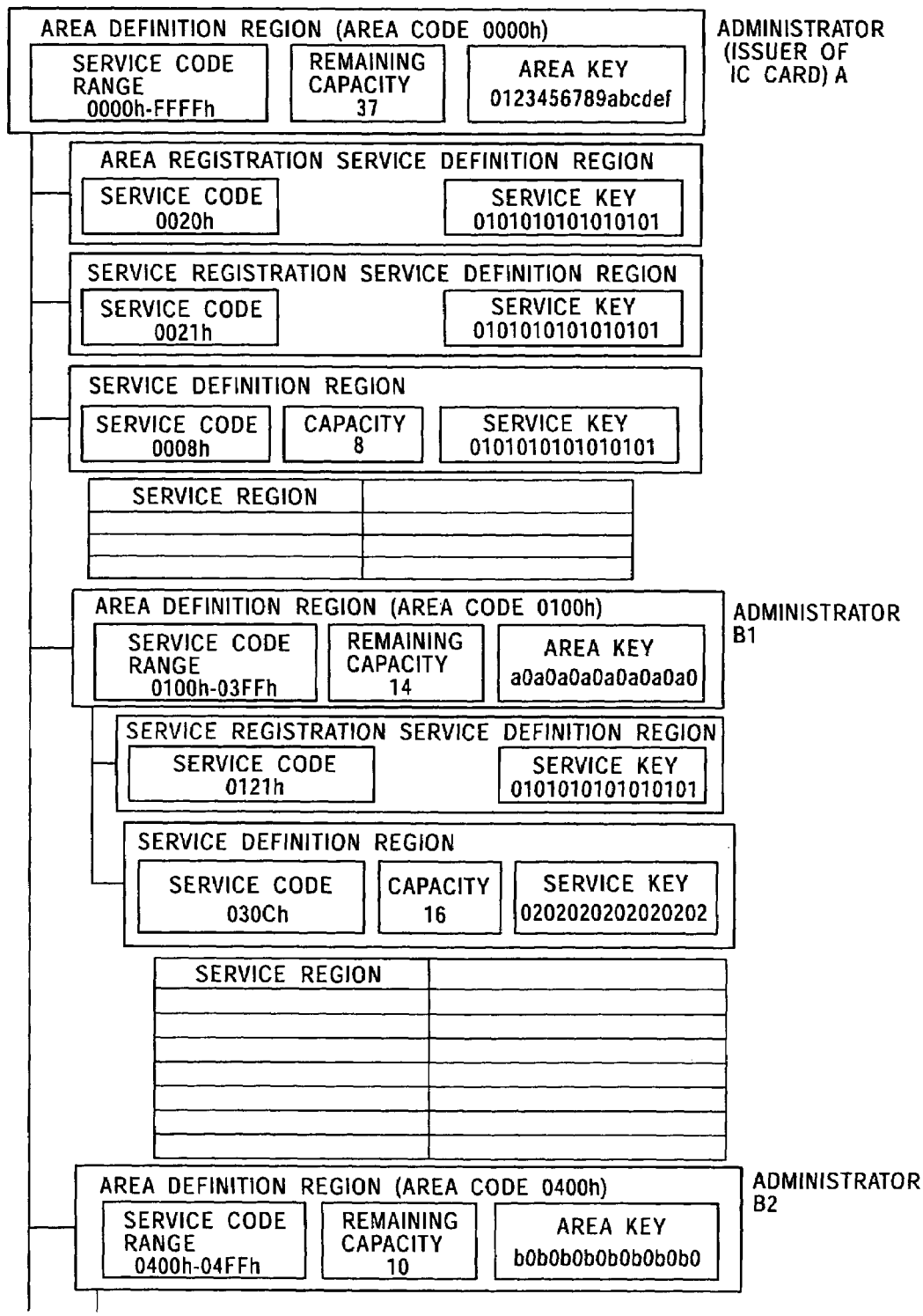
FIG. 8 is a diagram showing a directory structure of the EEPROM 66 shown in FIG. 6.

Next, in the sequencer 91, storage regions of the EEPROM 66 are managed in a hierarchical structure. FIG. 8 shows a directory structure of the EEPROM 66.

The storage regions of the EEPROM 66 form a hierarchical structure of area definition regions, and the area definition regions may include area definition regions, area registration service definition regions, service definition regions, and service registration service definition regions.

An area definition region is allocated to an administrator, and a code region indicating a range of identification codes that may be used by the administrator as names for identifying area definition regions and service definition regions, a remaining capacity indicating the number of empty blocks that may be used, an area key for generating an access key that is used for authentication, etc. are allocated therein. One area definition region corresponds to one area definition block described with reference to FIG. 7.

In the embodiment shown in FIG. 8, an area definition region allocated to an administrator A is at the uppermost layer, and area definition regions for administrators B1 and B2 are formed with the uppermost layer as a parent layer thereof.

In an area registration service definition region, a service key that is required when registering a new area definition region is allocated. Similarly, in a service registration service definition region, a service key that is required when registering a service definition region is allocated. These service keys are used to decrypt information that is supplied as information for forming a new area definition region or service definition region.

A service definition region is allocated to a service provided by an administrator, and a capacity of service region for storing data required for providing the service, a service key for generating an access key, etc. are allocated therein. One service definition region corresponds to one service definition block described with reference to FIG. 7.

A service region is a storage region for storing data required for providing a service, and it corresponds to user blocks in FIG. 7. More specifically, the service region consists of zero or more user blocks, and the number of user blocks constituting the service region is allocated as a capacity of a service definition region for administering the service region.

Furthermore, in area definition regions, service definition regions, area registration service definition regions, and service registration service definition regions, identification codes for identifying these regions are allocated. Identification codes for identifying area definition regions, and service definition regions, area registration service definition regions, and service registration service definition regions will hereinafter be referred to as area codes and service codes, respectively, when appropriate.

In the embodiment shown in FIG. 8, the area definition region at the uppermost layer is allocated to the administrator A. Furthermore, 0000h to FFFFh are defined as a range of identification codes that may be used (code range) and 0123456789abcdef is defined as an area key, respectively. Any identification code within the code range of the area definition region may be used as an area code of the area definition region. In this embodiment, for example, the minimum value within the code range of the area definition region is used as an area code thereof.

Thus, the area code of the area definition region with a code range of 0000h to FFFFh, that is, the area definition region allocated to the administrator A, is 0000h. An area definition region with an area code #xxxxh will hereinafter be referred to as an area definition region #xxxxh when appropriate.

In the layer of the area definition region #0000h of the administrator A, an area registration service definition region that is required when the administrator A permits another administrator to form a new area definition region is provided. In the area registration service definition region, of the code range 0000h to FFFFh of the area definition region #0000h, 0020h is assigned as a service code. An area registration service definition region with a service code #xxxxh will hereinafter be referred to as an area registration service definition region #xxxxh when appropriate.

In the layer of the area definition region #0000h of the administrator A, a service registration service definition region that is required when permitting formation of a new service definition region is provided. In the service registration service definition region, of the code range 0000h to FFFFh of the area definition region #0000h, 0021h is assigned as a service code. A service registration service definition region with a service code #xxxxh will hereinafter be referred to as a service registration service definition region #xxxxh when appropriate.

In the layer of the area definition region #0000h of the administrator A, a service definition region for the administrator A to provide a service is provided. In the service definition region, of the code range 0000h to FFFFh of the area definition region #0000h, 0008h is assigned as a service code. A service definition region with a service code #xxxxh will hereinafter be referred to as a service definition region #xxxxh when appropriate.

The service definition region #0008h has a capacity of eight, and thus allows usage of a service region consisting of eight user blocks. Furthermore, the service key of the service definition region #0008h is 0101010101010101.

Furthermore, in the layer of the area definition region #0000h of the administrator A, an area definition region #0100h of the administrator B1 and an area definition region #0040h of the administrator B2 are provided as child layers thereof. Furthermore, in the layer of the area definition region #0000h, other area definition regions that are not shown are provided. Thus, the number of blocks that may be used by the area definition region #0000h (remaining capacity) is, for example, thirty-seven blocks.

As a code range of the area definition region #0100h of the administrator B1, of the code range 0000h to FFFFh of the area definition region #0000h, which is the parent layer thereof, 0100h to 03FFh is allocated. Since the code range of the area definition region of the administrator B1 is 0100h to 03FFh, the minimum value thereof, i.e., 0100h, is assigned as an area code of the area definition region of the administrator B1.

Furthermore, the remaining capacity and the area key of the area definition region #0100h are fourteen and a0a0a0a0a0a0a0a0, respectively. Furthermore, in the layer of the area definition region #0100h of the administrator B1, a service registration service definition region #0121h is provided as a child layer thereof. The service code of the service registration service definition region is 0121h and the service key thereof is 0101010101010101.

In the layer of the service registration service definition region #0121h, a service definition region #030Ch for the administrator B1 to provide a service is provided. In the service definition region, of the code range 0100h to 03FFh of the area definition region #0100h, 030Ch is assigned as a service code.

The service definition region #030Ch with the service code 030Ch has a capacity of sixteen, allowing usage of a service region consisting of sixteen user blocks. The service key of the service definition region #030Ch is 0202020202020202.

Since the capacity of the service region administered by the service definition region #030Ch is sixteen and the service definition region #030Ch itself uses one block as a service definition block, the number of blocks that are used due to existence of the service definition region #030Ch is 17 (=16+1).

Furthermore, the service registration service definition region #0121h itself uses one block as a service definition block. Thus, in the layer of the service registration service definition region #0121h, the number of blocks in usage is 18 (=17+1). Thus, it is understood that the number of blocks allocated from the area definition region #0100h, which is the parent layer (upper layer) thereof, is eighteen.

Furthermore, in the layer of the area definition region #0100h, eighteen blocks are being used in the service registration service definition region #0121h and the service definition region #030Ch, which are child layers (lower layers) thereof, as described above. Furthermore, the area definition region #0100h itself uses one block as an area definition block. The remaining capacity of the area definition region #0100h is fourteen as described earlier. Thus, in the layer of the area definition region #0100h, the number of blocks in usage is 19 (=18+1) and the number of blocks that may be used is fourteen. Accordingly, it is understood that the number of blocks allocated from the area definition region #0000h, which is the parent layer thereof, is 33 (=19+14).

As a code range of the area definition region #0400h of the administrator B2, of the code range 0000h to FFFFh of the area definition region #0000h, which is the parent layer thereof, 0400h to 04FFh is allocated. Since the code range of the area definition region of the administrator B2 is 0400h to 04FFh, the minimum value thereof, i.e., 0400h, is assigned as an area code of the area definition region of the administrator B2. Furthermore, the remaining capacity and the area key of the area definition region #0400h are ten and b0b0b0b0b0b0b0b0, respectively.

Figure 9:
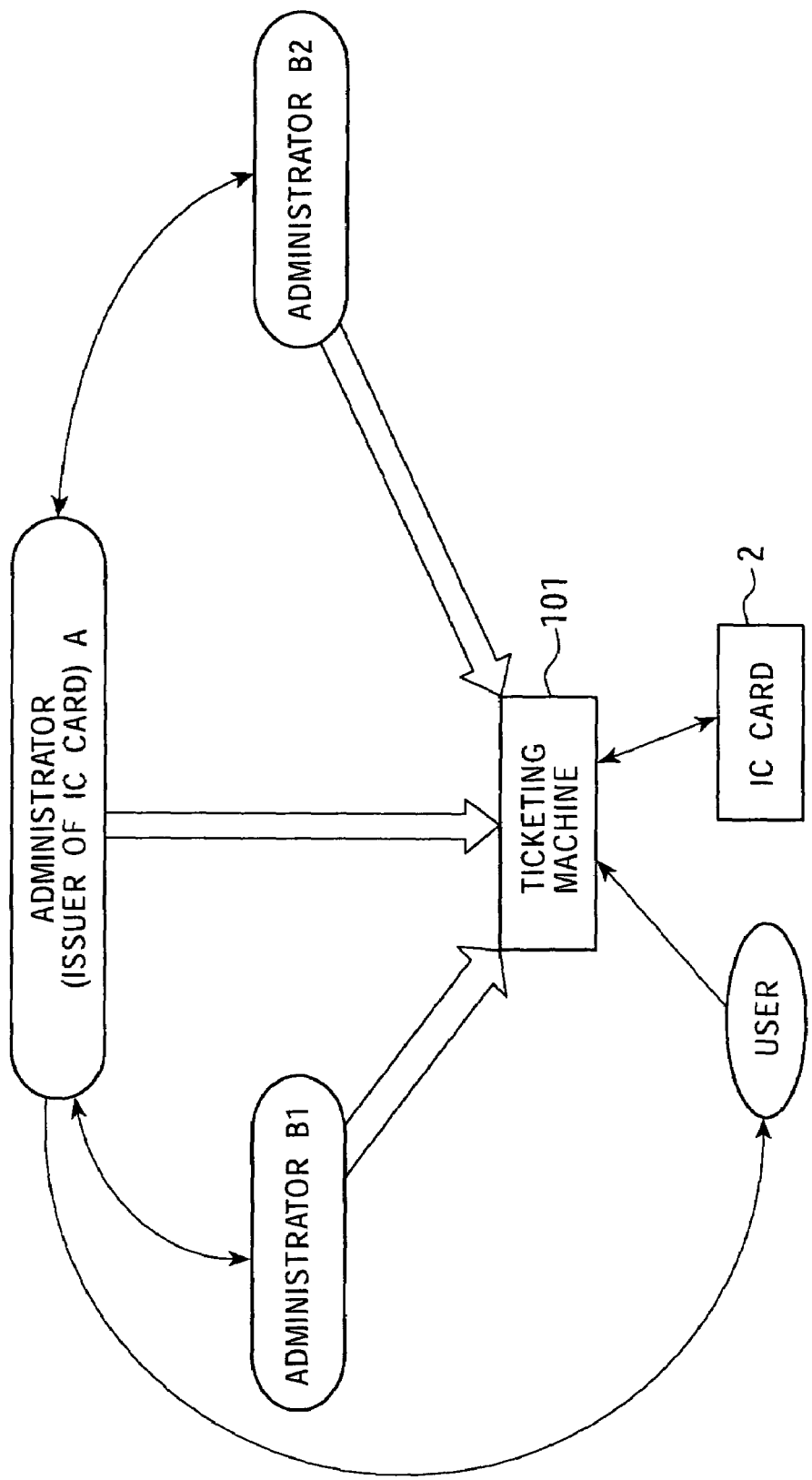
FIG. 9 is a diagram for explaining a process of forming the directory structure shown in FIG. 8.

Next, a process of forming the hierarchical structure shown in FIG. 8 will be described with reference to FIG. 9, assuming that, as an example, the administrator A, to which the area definition region #0000h at the uppermost layer is allocated, is an issuer of the IC card 2. The administrator A issues the IC card 2, for example, in response to a request from a user (1). Of the hierarchical structure shown in FIG. 8, for example, the area definition region #0000h, the area registration service definition region #0020h, and the service registration service definition region #0021h are formed in the IC card 2.

Although the area registration service definition region #0020h and the service registration service definition region #0021h are described herein as being formed at the time of issuance of the IC card 2, the arrangement may be such that only the area definition region #0000h is formed at the time of issuance of the IC card 2 and that the area registration service definition region #0020h and the service registration service definition region #0021h are formed at a later timing by a process similar to a process which will be described later.

Figure 1:
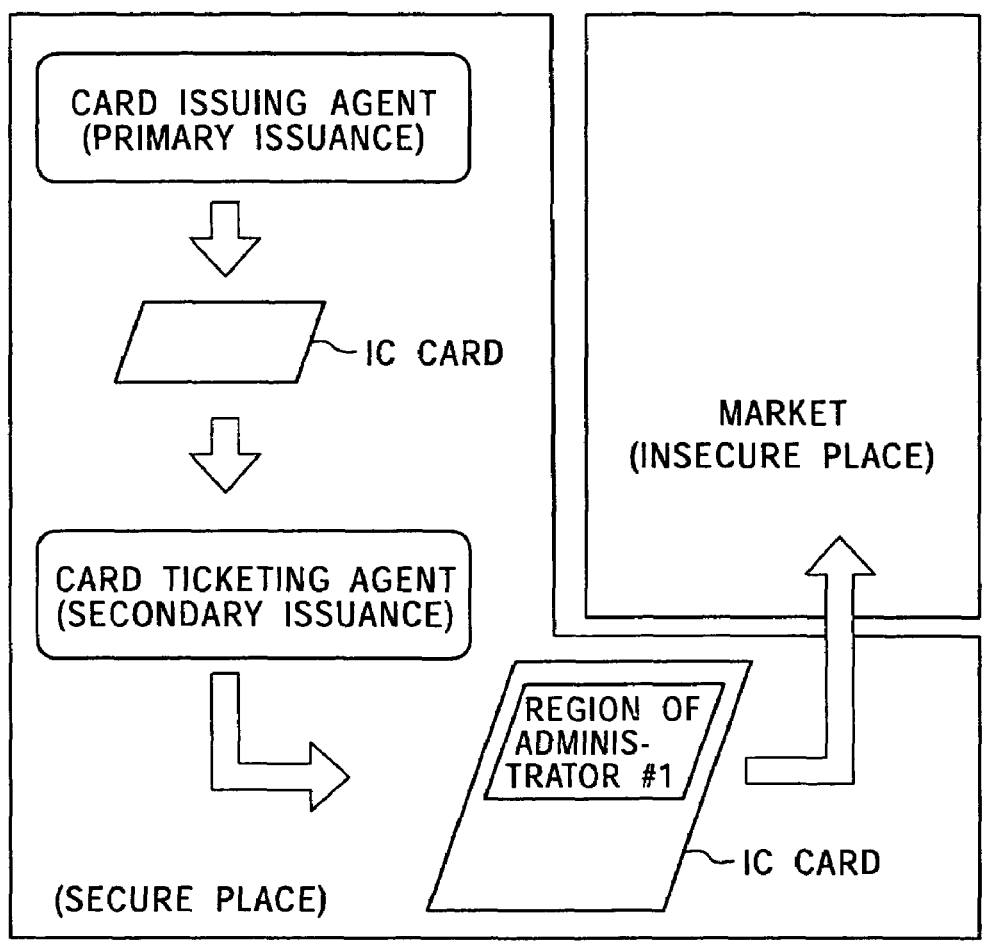
FIG. 1 is a diagram for explaining distribution of a conventional IC card.
Figure 2:
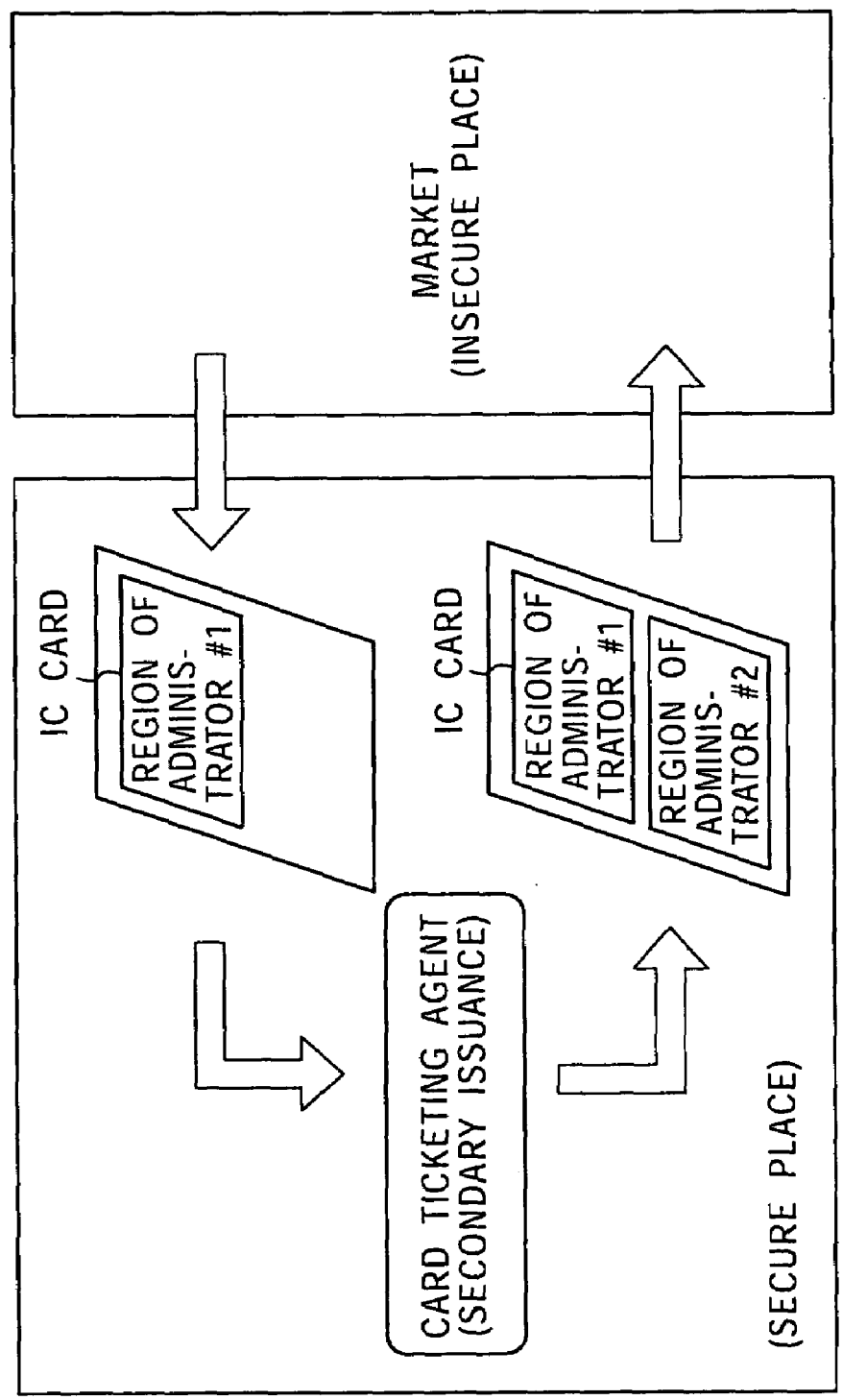
FIG. 2 is a diagram for explaining distribution of the conventional IC card.
Figure 3:
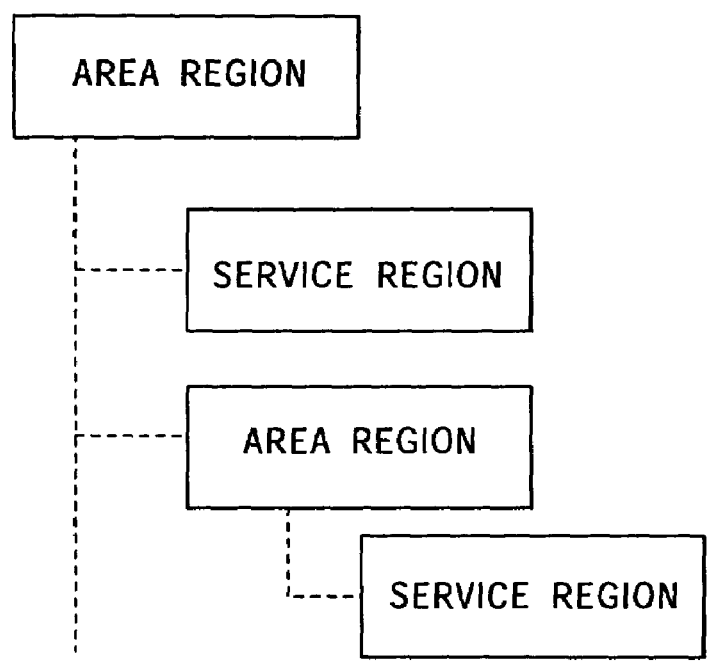
FIG. 3 is a diagram for explaining regions.

When the administrator A starts providing a predetermined service using a service region administered by a service definition region #0008h, the administrator A registers information required for forming the service definition region #0008h in a ticketing machine 101 (2). The ticketing machine 101 includes, for example, the R/W 1 and the controller 3 shown in FIG. 1. The ticketing machine 101 may be disposed, for example, at a station, a retail store, or other facilities.

When the user mounts the IC card 2 on the ticketing machine 101 (gets the IC card 2 into a state where communication with the R/W 1 included in the ticketing machine 101 is allowed), the ticketing machine 101 executes ticketing, that is, it transmits a command and required data to the IC card 2 based on the registered information, whereby the service definition region #0008h is formed. Thus, the user is allowed to receive the service by the administrator A using the service region administered by the service definition region #0008h.

Each of the administrators B1 and B2, if wishes to provide a service using the IC card 2, makes a contract in advance with the administrator A, asking the administrator A to register information required for forming area definition regions #0100h and #0400h in the ticketing machine 101 (3), (4). When the user mounts the IC card 2 on the ticketing machine 101, the ticketing machine 101 executes ticketing, that is, it transmits a command and required data to the IC card 2 based on registered information, whereby the area definition regions #0100h and #0400h are formed.

Thus, the administrator B1 or B2 is allowed to use resource of the IC card 2 within a range defined by the area definition region #0100h or #0400h. In this case, the administrator A is the ticketing agent to the administrator B1 or B2.

Then, when the administrator B1 wishes to start a predetermined service using an area administered by the area definition region #0100h, the administrator B1 asks the administrator A to register information required for forming a service registration service definition region #0121h in the ticketing machine 101 (5). When the user mounts the IC card 2 on the ticketing machine 101, the ticketing machine 101 executes ticketing, that is, it transmits a command and required data to the IC card 2 based on registered information, whereby the area definition region #0121h is formed.

When the service registration service definition region #0121h has been registered in the area definition region #0100h administered by the administrator B1 as described above, the administrator B1 completes preparation for providing a predetermined service using a service region administered by a service definition region #030Ch.

When the service registration service definition region #0121h has been registered, the administrator B1 registers information required for forming the service definition region #030Ch in the ticketing machine 101 (5). When the user mounts the IC card 2 on the ticketing machine 101, the ticketing machine 101 transmits a command and required data to the IC card 2 based on registered information, whereby the service definition region #030Ch is formed. Thus, the user is allowed to receive the service provided by the administrator B1 using a service region administered by the service definition region #030Ch.

Although the administrator A (a first administrator A (an issuer of an IC card)), the administrator B1 (a second administrator (an administrator other than the issuer of the IC card)), and the administrator B2 (a second administrator, i.e., an administrator in a position equivalent to that of the administrator B2) have been described as different administrators in the embodiment described with reference to FIG. 9, the first administrator and the second administrators may be the same administrator.

In the IC card 2, an area definition region, a service definition region, an area registration service definition region, or a service registration service definition region is formed. An area forming process for forming an area definition region, a service forming process for forming a service definition region, an area registration service forming process for forming an area registration service definition region, or a service registration service forming process for forming a service registration service definition region is executed, for example, by the sequencer 91. The area forming process, the service forming process, the area registration service forming process, and the service registration service forming process will be described with reference to a flowchart shown in FIG. 10.

Since the area forming process, the service forming process, the area registration service forming process, and the service registration service forming process are basically the same process, description will be made herein in the context of the area forming process as an example.

When the IC card 2 is mounted on the ticketing machine 101, for example, the ticketing machine 101 transmits to the IC card 2 a command for forming an area definition region (hereinafter referred to as an area formation command when appropriate) and information required for forming the area definition region, for example, a code range of the area definition region to be formed, the number of blocks allocated to the area definition region (hereinafter referred to as the number of allocated blocks when appropriate), an area key, etc.

Upon receiving the area formation command, the IC card 2 (the sequencer 91) recognizes the code range, the number of allocated blocks, the area key, etc. of the area definition region to be formed, transmitted together with the command. Furthermore, the IC card 2 recognizes an area code of the area definition region to be formed. That is, the minimum value of the code range of the area definition region to be formed is recognized as an area code thereof. Furthermore, the IC card 2 recognizes an area definition region with a code range including the code range of the area definition region to be formed as an area definition region of a parent layer of the area definition region to be formed.

In the IC card 2, it is determined in step S1 whether the area definition region to be formed has already been formed in the EEPROM 66. That is, in step S1, it is determined whether an area definition region having the same area code as that of the area definition region to be formed has already been formed.

If it is determined in step S1 that the area definition region to be formed has already been formed, the area forming process is exited. That is, if the area definition region has already been formed, the same area definition region need not be doubly formed, so that subsequent processing is not executed.

If it is determined in step S1 that the area definition region to be formed has not been formed, the procedure proceeds to step S2, in which it is determined whether the code range and the number of allocated blocks (capacity) of the area definition region to be formed are appropriate. That is, in step S2, it is determined whether the code range of the area definition region to be formed is within the code range stored in the area definition region of the parent layer and whether the number of allocated blocks of the area definition region to be formed is within the remaining capacity stored in the area definition region of the parent layer.

If it is determined in step S2 that the code range and the number of allocated blocks of the area definition region to be formed are not appropriate, that is, if the code range of the area definition region to be formed is not within the code range stored in the area definition region of the parent layer or if the number of allocated blocks of the area definition region to be formed exceeds the remaining capacity stored in the area definition region of the parent layer, the procedure proceeds to step S3, in which error processing is executed, and the area forming process is then exited.

That is, in step S3, for example, a message to the effect that an area definition region cannot be formed as a child layer of the area definition region of the parent layer is transmitted to the ticketing machine 101. Thus, in this case, an area definition region is not formed (ticketing is not executed).

On the other hand, if it is determined in step S2 that the code range and the number of allocated blocks of the area definition region to be formed are appropriate, that is, if the code range of the area definition region to be formed is within the code range stored in the area definition region of the parent layer and if the number of allocated blocks of the area definition region to be formed is within the remaining capacity stored in the area definition region of the parent layer, the procedure proceeds to step S4, in which the area definition region to be formed is formed as a child layer of the area definition region of the parent layer.

That is, in step S4, of empty blocks in the EEPROM 66 (FIG. 7), the lowermost block (an empty block with the highest logical address) is allocated as an area definition block corresponding to the area definition region to be formed. Furthermore, the code range, the remaining capacity, the area key, etc. are written (stored) in the area definition block.

In step S4, as for the code range and the area key, the code range and the area key transmitted from the ticketing machine 101 are written as they are. As the remaining capacity, a value obtained by subtracting one from the number of allocated blocks transmitted from the ticketing machine 101 is written. The reason why the value obtained by subtracting one from the number of allocated blocks is written as the remaining capacity is that the area definition region that has been formed uses one block.

Then, the procedure proceeds to step S5, in which the remaining capacity of the area definition region of the parent layer is rewritten, and the area forming process is exited. That is, in step S5, a value obtained by subtracting the number of allocated blocks from the remaining capacity of the area definition region of the parent layer is newly written as the remaining capacity of the area definition region of the parent layer.

The respective area definition regions #0100h and #0400h of the administrators B1 and B2, shown in FIG. 8, are formed by executing the area forming process described above. That is, at the time of issuance of the IC card 2, the administrator A, as the issuer thereof, owns all the resource of the IC card 2. For example, identification codes and capacity that may be used of the IC card 2 are 0000h to FFFFh and 65,533 blocks, at the time of issuance of the IC card 2, the only area definition region that exists is the area definition region #0000h at the uppermost layer with a code range of 0000h to FFFFh and a remaining capacity of 65,532.

In this embodiment, the EEPROM 66 has 65,536 blocks as shown in FIG. 7. The reason why capacity that may be used of the IC card 2 immediately after issuance thereof is 65,533 blocks, three blocks fewer than that, is that the production ID block, the issuance ID block, and the system definition block are present, as shown in FIG. 7.

Also, the remaining capacity of the area definition region #0000h at the uppermost layer is 65,532 blocks, one block fewer than 65,533 blocks that may be used, is that the area definition region #0000h itself uses one block.

Figure 10:
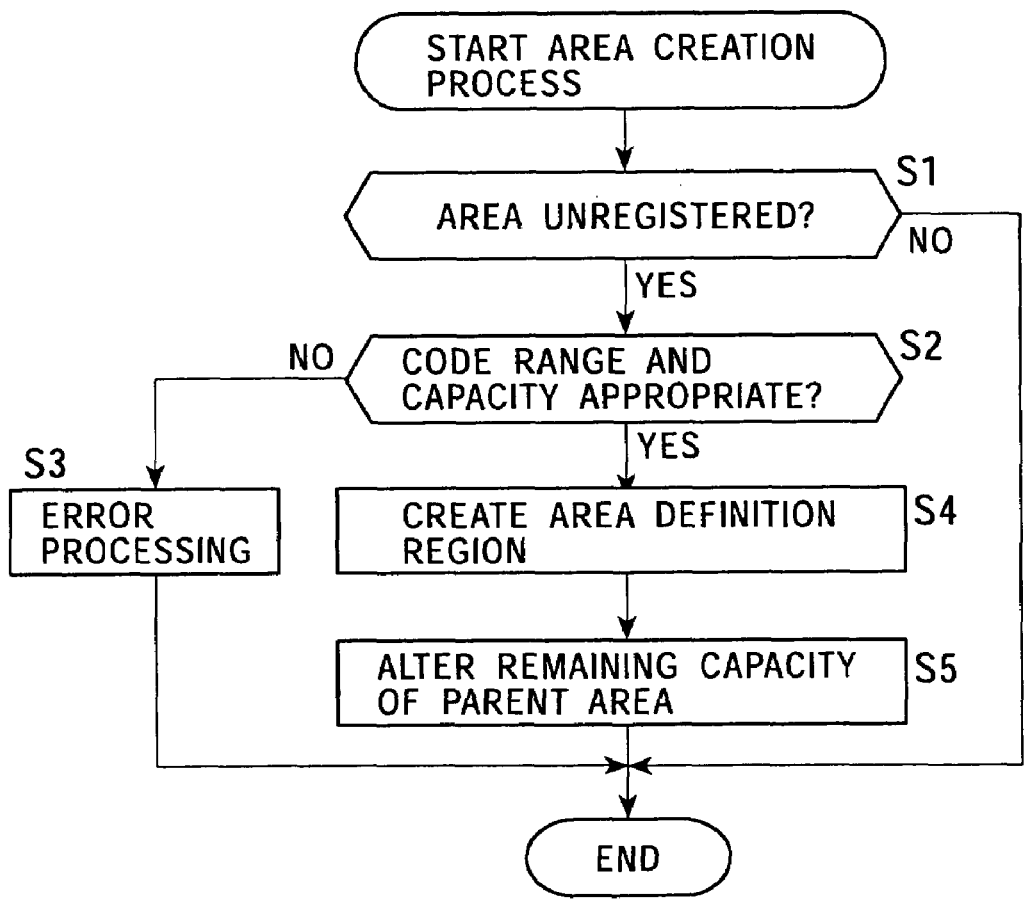
FIG. 10 is a flowchart for explaining an area forming process.

A service definition region is formed basically by a process similar to the area forming process described with reference to the flowchart shown in FIG. 10; however, in step S2, it is determined whether a service code, instead of the code range, is appropriate. That is, in step S2, it is determined whether the service code of the service definition region to be formed is within the code range stored in the area definition region of the parent layer and whether the number of allocated blocks of the service definition region to be formed is within the remaining capacity stored in the area definition region of the parent layer.

Also, an area registration service definition region and a service registration service definition region are formed basically by a process similar to the area forming process described with reference to the flowchart shown in FIG. 10; however, in step S2, it is determined whether a service code, instead of the code range, is appropriate.

That is, in step S2, it is determined whether the service code of the area registration service definition region or the service registration service definition region to be formed is within the code range stored in the area definition region of the parent layer. Since each of the area registration service definition region and the service registration service definition region occupies only one block, it is sufficient that the remaining capacity stored in the area definition region of the parent layer exists.

Next, when administration information for administering user blocks (hereinafter also referred to as ticketing information when appropriate), required for forming an area definition region, a service definition region, etc., such as a code range, the number of allocated blocks, an area key, a service key, is registered in the ticketing machine 101 and ticketing is executed as described with reference to FIG. 9, if the ticketing machine 101 is disposed, for example, at a station, a retail store, or other insecure places, it is not preferable from the viewpoint of security management because susceptibility to unjust acts such as eavesdropping and tampering is high as described earlier.

Figure 11:
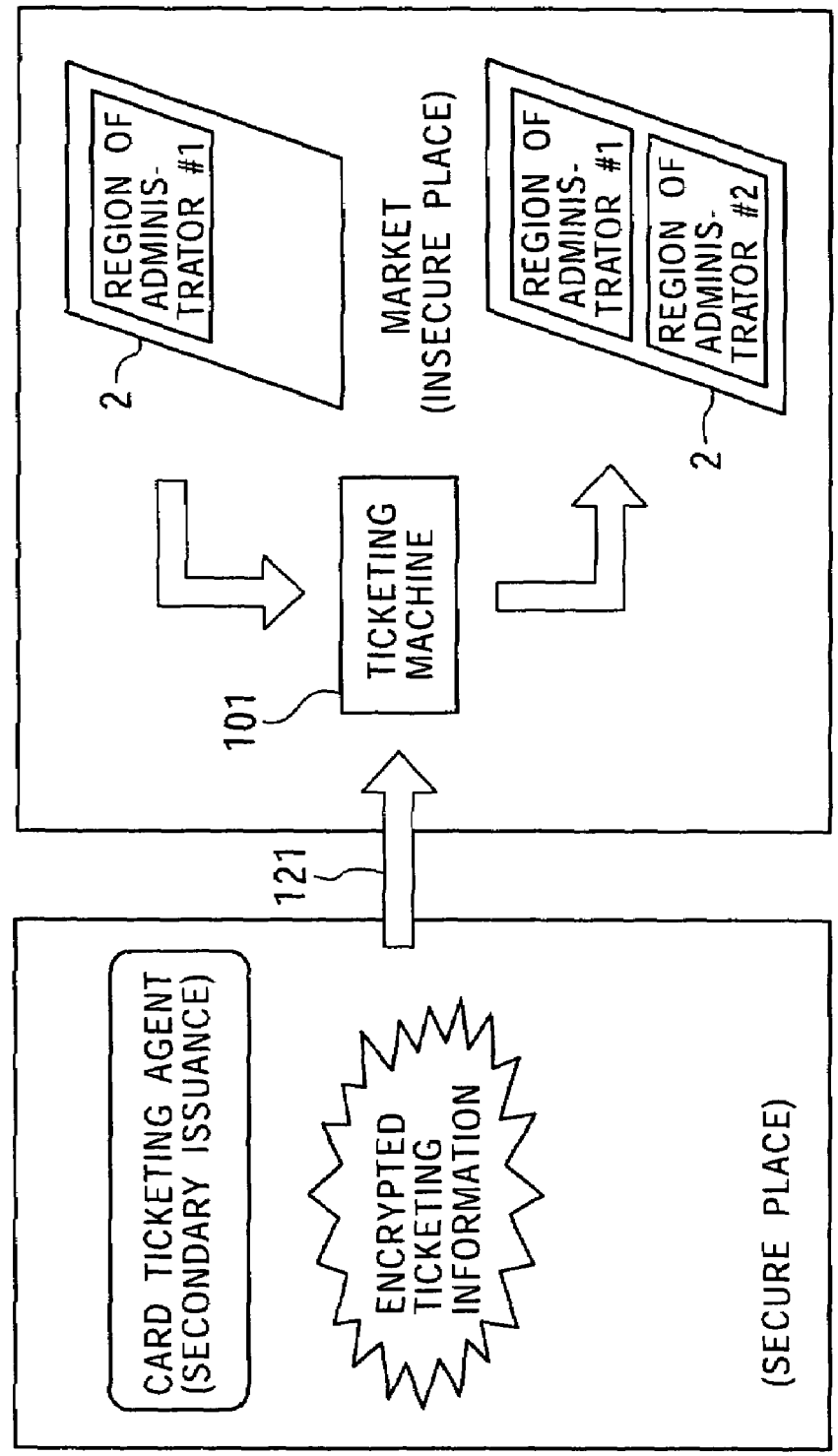
FIG. 11 is a diagram for explaining the principles of the present invention.

Thus, as shown in FIG. 11, an administrator that is to form an area definition region, a service definition region, etc. (hereinafter referred to as a ticketing agent when appropriate) encrypts ticketing information and transmits the encrypted ticketing information to and registers it in the ticketing machine 101 via a transmission medium 121 such as a public network, the Internet, a terrestrial wave, a satellite link, or a CATV (Cable Television) network. The ticketing machine 101 transmits the encrypted ticketing information to the IC card 2, and the IC card 2 decrypts the encrypted ticketing information and forms an area definition region or a service definition region.

FIG. 11 shows the IC card 2 in which only a storage region for the administrator #1 to provide a service had been configured and in which a storage region for the administrator #2 to provide a service has been configured (ticketing has been executed) as described above.

Figure 12:
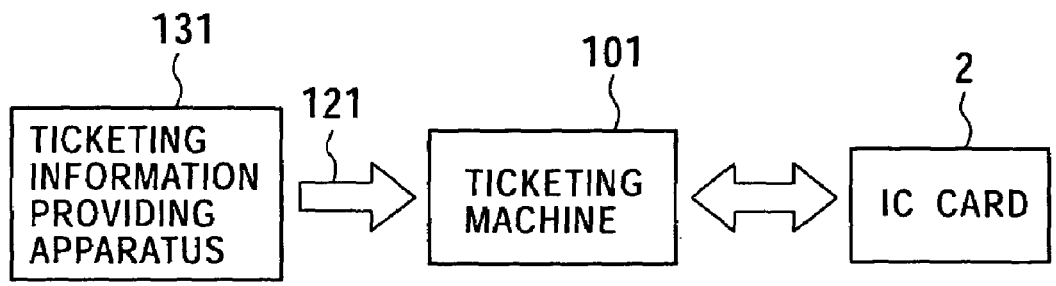
FIG. 12 is a block diagram showing an example construction of a ticketing processing system according to an embodiment of the present invention.

Next, FIG. 12 shows an example construction, according to an embodiment, of a ticketing processing system that executes the ticketing process described above. A ticketing information providing apparatus 131 executes a ticketing information providing process, which will be described later, to transmit ticketing information in an encrypted form (hereinafter referred to as encrypted ticketing information when appropriate) to the ticketing machine 101 via the transmission medium 121.

The ticketing machine 101 receives the encrypted ticketing information from the ticketing information providing apparatus 131 and registers it. When the IC card 2 is mounted, the ticketing machine 101 transmits the encrypted ticketing information to the IC card 2. The IC card 2 receives the encrypted ticketing information from the ticketing machine 101, and executes a decryption process which will be described later, thereby decrypting the encrypted ticketing information into original ticketing information. Then, the IC card 2 executes the area forming process, the service forming process, etc. described with reference to the flowchart shown in FIG. 10, thereby forming an area definition region or a service definition region based on the decrypted ticketing information.

Figure 13:
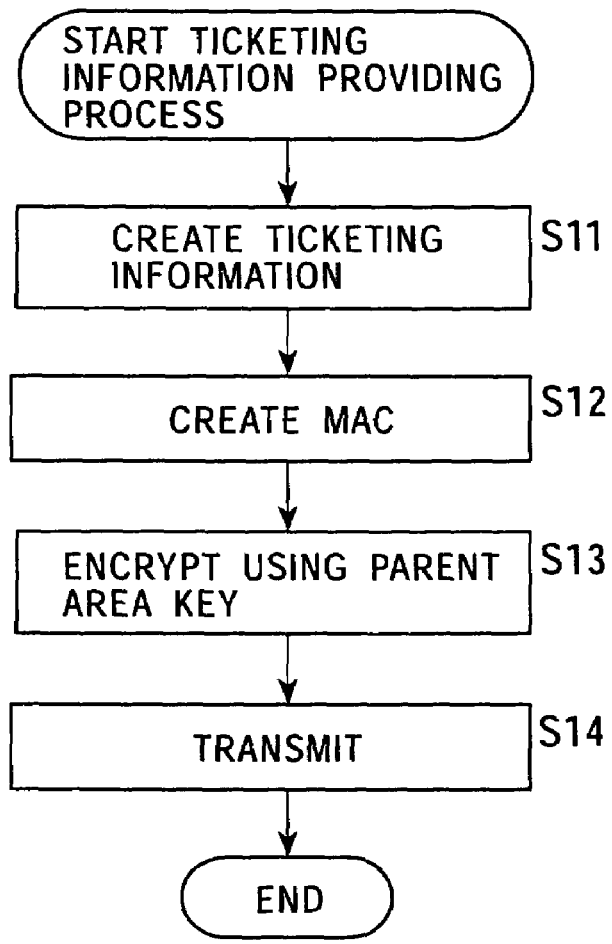
FIG. 13 is a flowchart for explaining a ticketing information providing process.

Next, a ticketing information providing process executed by the ticketing information providing apparatus 131 will be described with reference to a flowchart shown in FIG. 13. The ticketing information providing apparatus 131 receives input of, for example, a code range, the number of allocated blocks, and an area key required for forming an area definition region; for example, a service code, the number of allocated blocks, and a service key required for forming a service definition region; for example, a service code and a service key required for forming an area registration service definition region; or, for example, a service code and a service key required for forming a service registration service definition region. Then, in step S11, ticketing information is created based on the input information.

That is, for example, in the case of an area definition region, when a code range, the number of allocated blocks, and an area key required for forming the area definition region are input, ticketing information is created by associating those items. Forming of a service definition region, an area registration service definition region, or a service registration service definition region is executed in a similar manner.

Then, the procedure proceeds to step S12, in which a MAC (message authentication code) is created. The MAC is created by using a hash code, etc. so that creation of different original data (e.g., combination of a service code range, a capacity, an area key etc. in this case) having the same MAC is inhibited.

Then, in step S13, the ticketing information is encrypted. Details of the encryption will be described later. The procedure proceeds to step S14, in which an identification code (an area code if the encrypted ticketing information is for forming an area definition region, or a service code if the encrypted ticketing information is for forming a service definition region, an area registration service definition region, or a service registration service definition region) is added to the encrypted ticketing information as a header, and the information is transmitted to the ticketing machine 101 via the transmission medium 121, and the ticketing information providing process is exited.

In this embodiment, the ticketing information created in step S11 is one of information for forming an area definition region, information for forming a service definition region, information for forming an area registration service definition region, and information for forming a service registration service definition region.

Figure 14A:
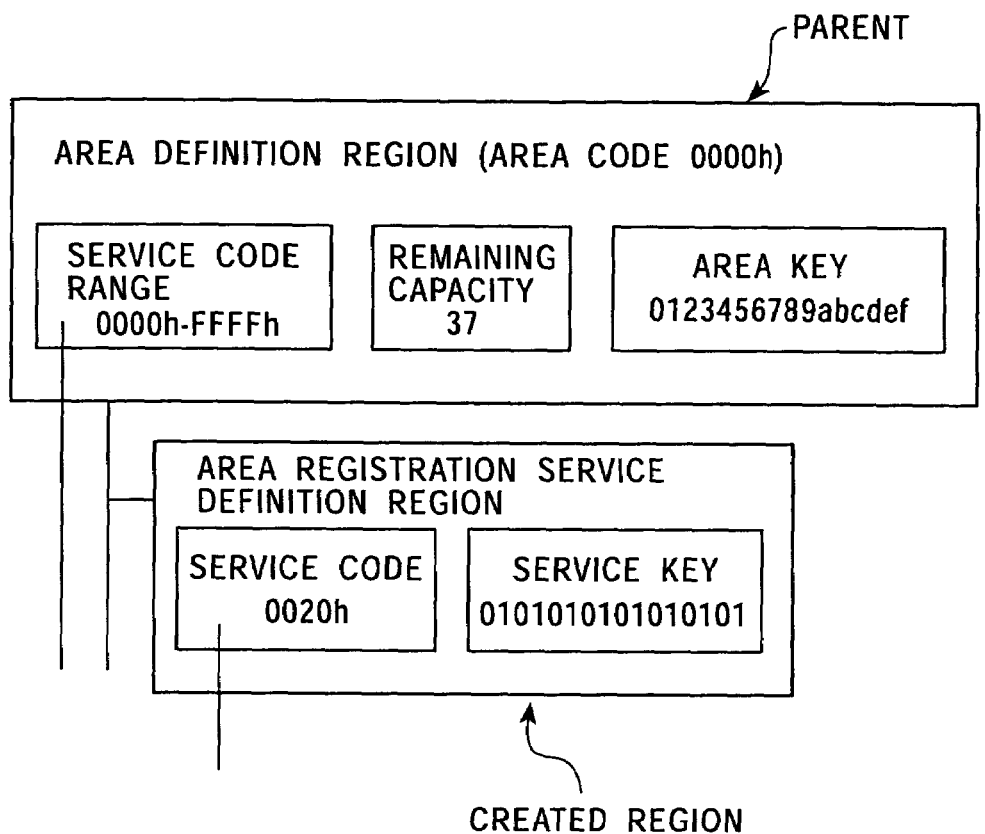
FIG. 14A is a diagram for explaining forming of an area registration service definition region.

First, a case where a new area registration service definition region #0020h is formed in step S11 under the area definition region #0000h that has already been registered, as shown in FIG. 14A, will be described. Since the area registration service definition region #0020h is newly formed, in step S11, ticketing information is created by associating a service code (0020h) and a service key (0101010101010101).

Figure 14B:
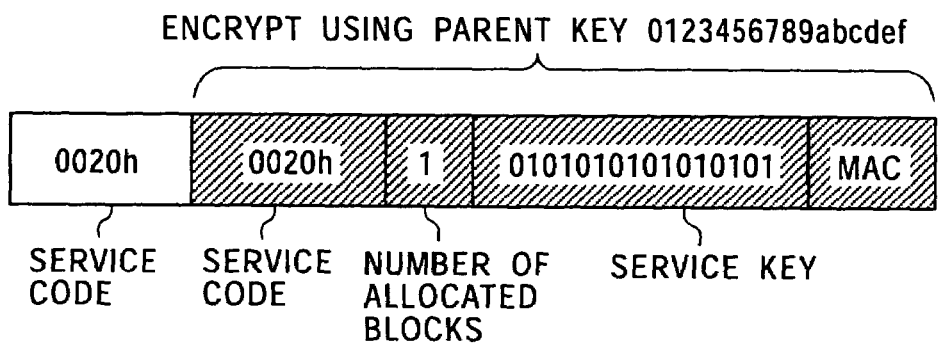
FIG. 14B is a diagram for explaining forming of an area registration service definition region.

More specifically, ticketing information that has been created and encrypted is as shown in FIG. 14B. That is, at the beginning of the ticketing information shown in FIG. 14B, a service code #0020h of the area registration service definition region #0020h is disposed as a header. The service code #0020h is not encrypted so that the parent layer can be identified in the IC card 2.

The service code #0020h serving as a header, which is not encrypted, is followed sequentially by the service code #0020h, one as the number of allocation blocks, 0101010101010101 that serves as a service key #0020h, and a MAC that are to be stored in the area registration service definition region #0020h. These items are encrypted (shown as shaded in FIG. 14B) using 0123456789abcdef, which is the area key #0000h of the area definition region #0000h serving as a parent.

Figure 15A:
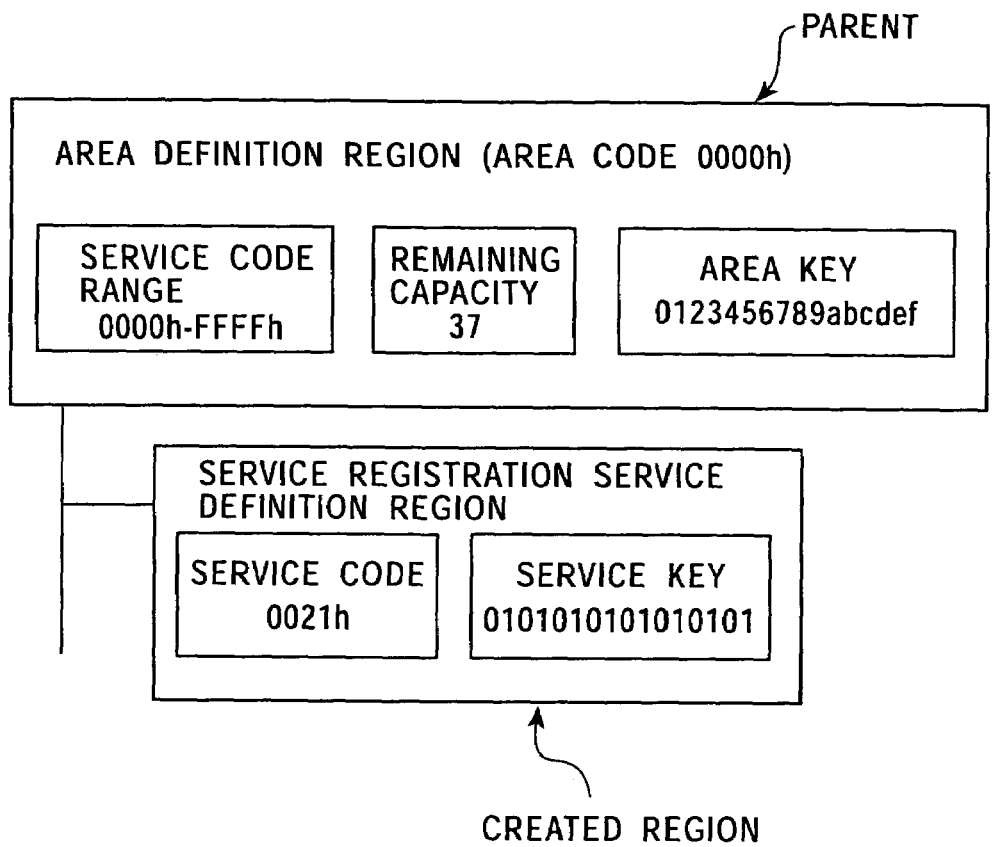
FIG. 15A is a diagram for explaining forming of a service registration service definition region.
Figure 15B:
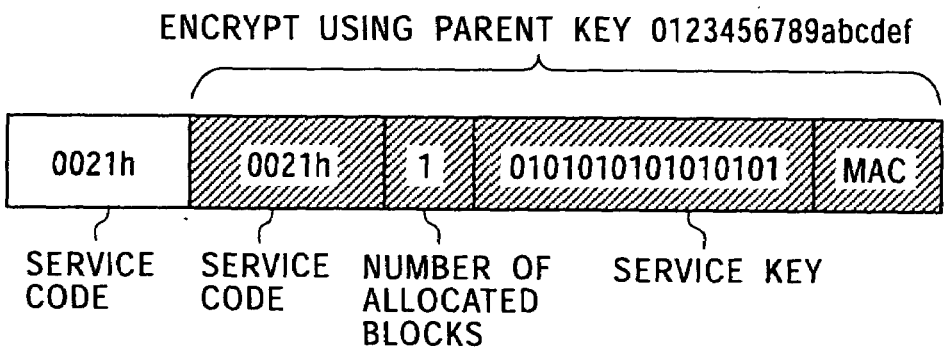
FIG. 15B is a diagram for explaining forming of a service registration service definition region.

Next, a case where a new service registration service definition region #0021h is formed under the area definition region #0000h that has already been registered, as shown in FIG. 15A, will be described. When the service registration service definition region #0021h is formed, ticketing information that is created is as shown in FIG. 15B. That is, at the beginning of the ticketing information shown in FIG. 15B, a service code #0021h of the service registration service definition region #0021h is disposed as a header. The service code #0021h is not encrypted so that the parent layer can be identified in the IC card 2.

The service code #0021h serving as a header, which is not encrypted, is followed sequentially by the service code #0021h, one as the number of allocated blocks, 0101010101010101 as a service key #0021h, and a MAC that are to be stored in the service registration service definition region #0021h. These items are encrypted (shown as shaded in FIG. 15B) by the process of step S13 using 0123456789abcdef, which is the area key #0000h of the area definition region #0000h serving as a parent.

Figure 16A:
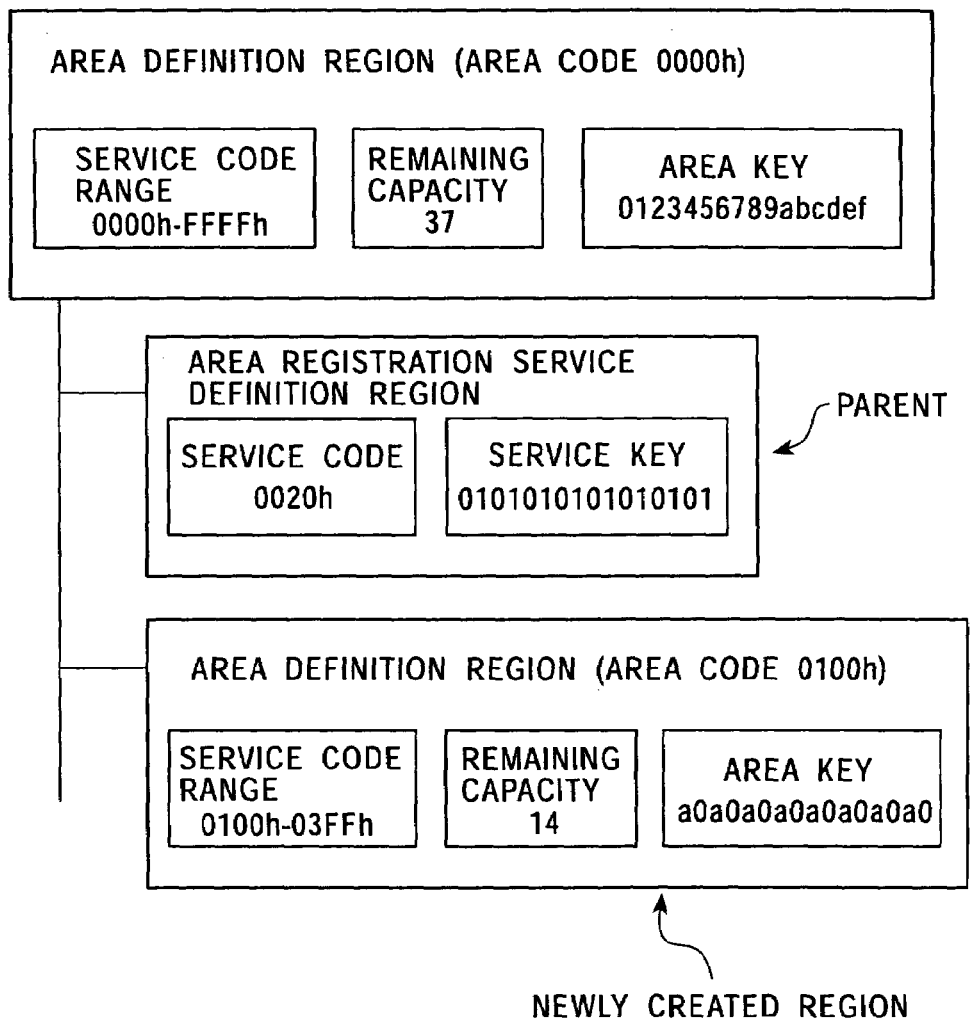
FIG. 16A is a diagram for explaining forming of an area definition region.
Figure 16B:
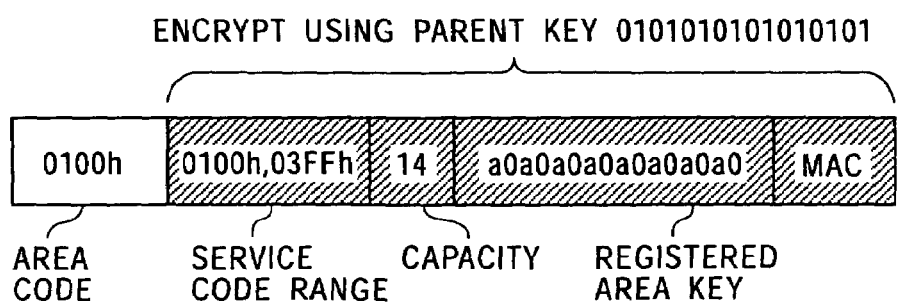
FIG. 16B is a diagram for explaining forming of an area definition region.

Next, a case where a new area definition region #0100h is formed under the area definition region #0000h that has already been registered, as shown in FIG. 16A, will be described. Ticketing information that is created is as shown in FIG. 16B. That is, at the beginning of the ticketing information shown in FIG. 16B, an area code #0100h of the area definition region #0100h is disposed as a header.

The area code #0100h is not encrypted so that the parent layer can be identified in the IC card 2. In the ticketing information providing apparatus 131, the area code #0100h is identified by the code range in input information. This is because the area code can be identified by the code range since the area code of an area definition region is the minimum value in the code range thereof in this embodiment as described earlier.

The area code #0100h serving as a header, which is not encrypted, is followed sequentially by a service code range #0100h to 03FFh, fourteen as the number of allocated blocks (capacity), a0a0a0a0a0a0a0a0 as an area key #0100h, and a MAC that are to be stored in the area definition region #0100h. These items are encrypted (shown as shaded in FIG. 16B) by the process of step S13 using 0101010101010101, which is the service key #0020h of the area registration service definition region #0020h serving as a parent.

When an area definition region is newly formed as above, encryption is executed using a service key of an area registration service definition region that has already been formed. Thus, referring to FIG. 8, for example, the administrator B1 not having an area registration service definition region is not allowed to provide an area definition region administered by another administrator C in the area definition region #010h administered by the administrator B1.

That is, in the IC card 2, even if a command for newly forming an area definition region is received, if a service key of an area registration service definition region that serves as a parent is not stored in the IC card 2, decryption is not allowed. This indicates that, for example, the administrator A is allowed to inhibit the administrator B1 from subleasing a region administered by the administrator B1.

Figure 17A:
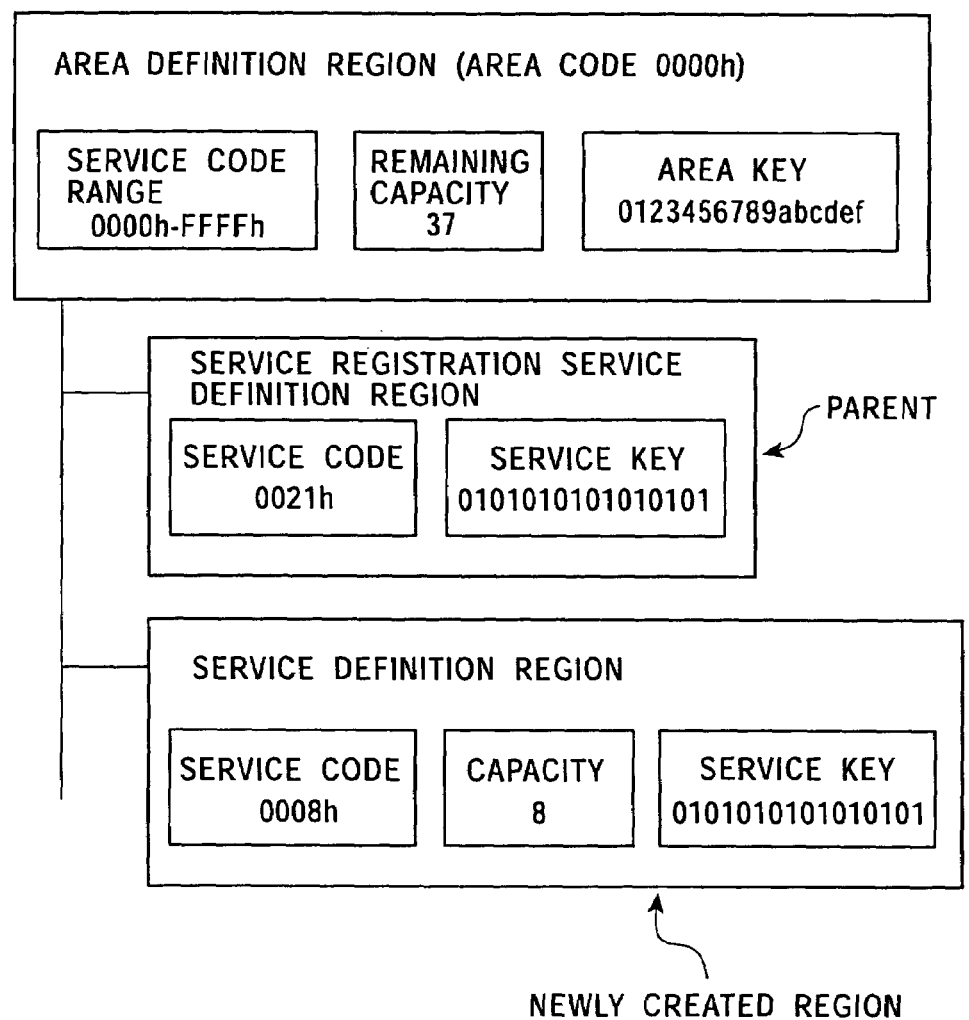
FIG. 17A is a diagram for explaining forming of a service definition region.
Figure 17B:
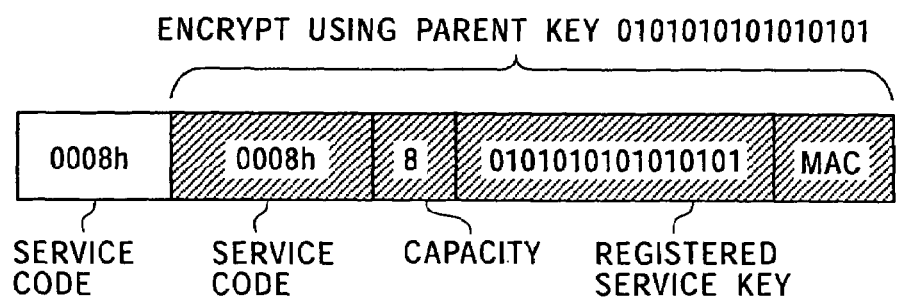
FIG. 17B is a diagram for explaining forming of a service definition region.

Next, a case where a new service definition region #0008h is formed under the area definition region #0000h that has already been registered, as shown in FIG. 17A, will be described. Ticketing information that is created is as shown in FIG. 17B. That is, at the beginning of the ticketing information shown in FIG. 17B, a service code #0008h of the service definition region #0008h is disposed as a header. The service code #0008h is not encrypted so that the parent layer can be identified in the IC card 2.

The service code #0008h serving as a header, which is not encrypted, is followed sequentially by the service code #0008h, eight as the number of allocated blocks, 0101010101010101 that serves as a service key #0008h, and a MAC that are to be stored in the service definition region #0008h. These items are encrypted by the process of step S13 (shown as shaded in FIG. 17B) using 0101010101010101, which is the service key of the service registration service definition region #0021h serving as a parent.

When an area definition region is newly formed, encryption is executed using a service key of an area registration service definition region that has already been formed. Thus, referring to FIG. 8, for example, the administrator B1 having the service registration service definition region #0121h is allowed to provide a service definition region 030Ch in the area definition region 0100h administered by the administrator B1, but another administrator C (not shown) not having a service registration service definition region is not allowed to provide a service definition region in an area definition region under administration.

That is, in the IC card 2, even if a command for newly forming a service definition region is received, if a service key of a service registration service definition region that serves as a parent is not stored in the IC card 2, decryption is not allowed. This indicates that, for example, the administrator A is allowed to permit the administrator C to provide an area definition region but not to provide a service definition region.

As described above, in this embodiment, the administrator A (the issuer of the IC card 2 in this case) is allowed to provide a new area definition region under the area definition region #000h administered by the administrator A, and to assign a right to provide yet another area definition region and a right to provide a service definition region under the area definition region separately to other business entities.

As described above, since ticketing information is encrypted using an area key or a service key that is a parent, it is impossible to know content of the ticketing information unless the area key or the service key is known. Thus, leakage of the content of the encrypted ticketing information is prevented even if the encrypted ticketing information is transmitted to an insecure place. Furthermore, as a result, for example, it is possible to distribute the encrypted ticketing information to a third party to ask registration on the ticketing machine 101, transmission to the IC card 2, etc.

Since the ticketing information is encrypted herein using an area key or a service key that is a parent, basically, it is desired that the ticketing information providing process be executed under the supervision of an administrator of the parent. That is, if the ticketing information providing process is executed by a third party, the area key or the service key that is the parent, used for encryption, must be known to the third party, which is not preferable from the viewpoint of security; thus, it is desired that the ticketing information providing process be executed under the supervision of an administrator of the parent.

Figure 18:
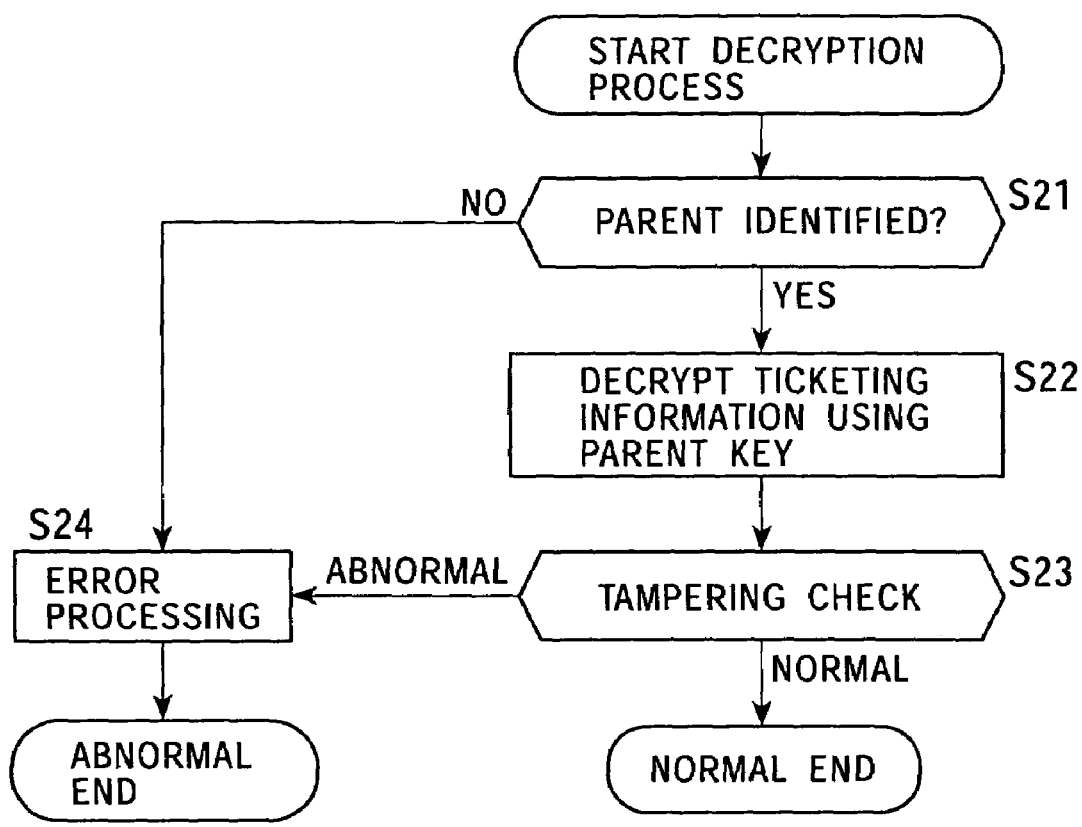
FIG. 18 is a flowchart for explaining a decryption process.

Next, a decryption process that is executed by the IC card 2 will be described with reference to a flowchart shown in FIG. 18. As described earlier, when encrypted ticketing information is transmitted from the ticketing information providing apparatus 131, the ticketing machine 101 receives and registers it. When the IC card 2 is mounted, the ticketing machine 101 transmits the encrypted ticketing information to the IC card 2.

The IC card 2 receives the encrypted ticketing information from the ticketing machine 101, and it determines in step S21 whether a corresponding area definition region, area registration service definition region, or service registration service definition region has been identified as a parent of an area definition region, a service definition region, an area registration service definition region, or service registration service definition region that is to be formed based on the encrypted ticketing information.

That is, in step S21, by referring to the header of the encrypted ticketing information, the area code of an area definition region, the service code of a service definition region, the service code of an area registration service definition region, or the service code of a service registration service definition region that is to be formed is recognized.

Furthermore, in step S21, if an area registration service definition region is to be formed as shown in FIGS. 14A and 14B or if a service registration service definition region is to be formed as shown in FIGS. 15A and 15B, an area definition region that includes the service code recognized in the code range thereof is detected from the EEPROM 66, and the area definition region is identified as a parent.

If an area definition region is to be formed as shown in FIGS. 16A and 16B, an area definition region that includes an area code recognized in the code range thereof is detected, an area registration service definition region registered thereunder is detected from the EEPROM 66, and the area registration service definition region is identified as a parent layer. If a service definition region is to be formed as shown in FIGS. 17A and 17B, an area definition region that includes a service code recognized in the code range thereof is detected, a service registration service definition region registered thereunder is detected from the EEPROM 66, and the service registration service definition region is identified as a parent.

If a parent of the region to be formed has been identified in step S21 by the process described above, the procedure proceeds to step S22, while it proceeds to step S24 when identification failed. A possible cause of failure in identifying a parent is that, for example, when an area definition region is to be formed, an area registration service definition region that serves as a parent thereof has not been registered.

In step S22, the encrypted ticketing information is decrypted using an area key stored in the area definition region of the parent layer recognized in step S21, a service key stored in the area registration service definition region, a service key stored in the service definition region, or a service key stored in the service registration service definition region, and then the procedure proceeds to step S23.

In step S23, it is determined whether the ticketing information has been tampered based on a MAC included in the decrypted ticketing information. The determination is executed by checking whether the decrypted MAC coincides with a MAC that is newly calculated by the IC card 2 from other decoded information.

If it is determined in step S23 that the ticketing information has been tampered, the procedure proceeds to step S24, in which a message to the effect that the ticketing information has been tampered is transmitted to the ticketing machine 101 and error processing such as deletion of the decrypted ticketing information is executed, and the decryption process is exited. In this case, the decryption process abnormally ends, and an area definition region or a service definition region is not formed. If the procedure has proceeded from step S21 to step S24, a message to the effect that an area registration service definition region or a service registration service definition region has not been registered is transmitted to the ticketing machine 101, error processing such as deletion of the decrypted ticketing information is executed, and the decryption process is exited.

On the other hand, if it is determined in step S23 that the ticketing information has not been tampered, the decryption process is exited. In this case, the decryption process normally ends, and then a process of storing the decrypted ticketing information in the EEPROM 66, i.e., corresponding one of the area forming process, the service forming process, the area registration service forming process, and the service registration service forming process for forming an area definition region, etc. is executed.

As described, above, the ticketing information providing apparatus 131 encrypts ticketing information to create encrypted ticketing information, and the IC card 2 decrypts the encrypted ticketing information. Accordingly, unjust acts such as eavesdropping and tampering are prevented even if the ticketing machine 101 is disposed at an insecure place and if transmission takes place via the transmission medium 121.

As a result, when ticketing is executed in order to start providing a new service using the IC card 2, the IC card 2 need not be collected, serving to reduce cost needed for collection. Furthermore, a user of the IC card 2 is allowed to receive the new service immediately, without having the IC card 2 collected, by carrying the IC card 2 to a place where the ticketing machine 101 is disposed and executing ticketing.

Furthermore, as described earlier, a predetermined administrator is allowed to select from permitting other administrator to form only an area definition region, only a service definition region, or both an area definition region and a service definition region, and is thus allowed to add restriction as to whether or not to permit an administrator that is allowed to form a region is also allowed to transfer a region to another administrator.

Although the present invention has been described hereinabove in the context of a non-contact card system, in which communications are executed in a non-contact manner, the present invention may also be applied to a card system in which communications are executed in contact. Furthermore, the scope of the present invention is not limited to card systems.

Although both user blocks and system blocks are stored in a single memory, i.e., the EEPROM 66, user blocks and system blocks may be stored in physically separate memories.

Furthermore, although data is stored in the EEPROM in this embodiment, data may be stored in a semiconductor memory other than the EEPROM, on a magnetic disk, etc.

Furthermore, although storage regions of the EEPROM 66 are managed in a hierarchical structure in the embodiment, the present invention may also be applied to a case where storage regions of the EEPROM 66 are not managed in a hierarchical structure.

Furthermore, although encrypted ticketing information is transmitted via the transmission medium 121 and registered in the ticketing machine 101 in the embodiment, encrypted ticketing information may be stored in a recording medium (storage medium) such as a magnetic disk, a magneto-optical disk, an optical disk, a memory card, or a magnetic tape, and registered by directly carrying it to the ticketing machine 101.

The series of processes described above may be executed by software as well as by hardware. When the series of processes are executed by software, a program constituting the software is installed from a recording medium onto a computer embedded in dedicated hardware, or onto a general-purpose personal computer or the like that is capable of executing various functions when various programs are installed thereon.

Figure 19:
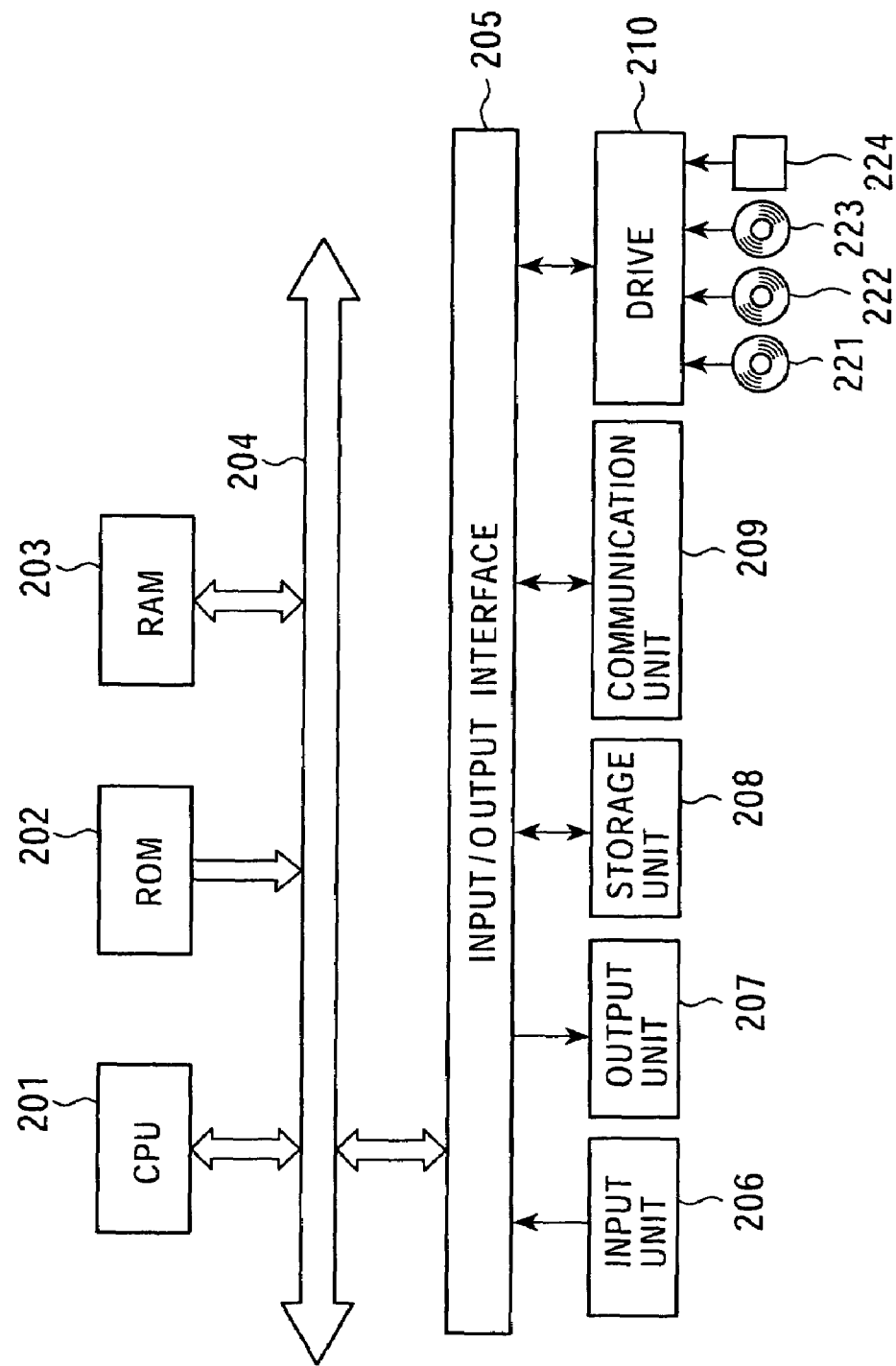
FIG. 19 is a diagram for explaining a medium.

FIG. 19 is a diagram showing an example construction of a general-purpose personal computer. A CPU (Central Processing Unit) 201 of the personal computer executes various processes according to programs stored in a ROM (Read Only Memory) 202 or a RAM (Random Access Memory) 203. The RAM 203 stores data and programs as required when the CPU 201 executes various processes. An input/output interface 205 is connected to an input unit 206 including a keyboard and a mouse, and it outputs to the CPU 201 signals that have been input to the input unit 206. The input/output interface 205 is also connected to an output unit 207 including a display, a speaker, etc.

Furthermore, the input/output interface 205 is connected to a storage unit 208 implemented by a hard disk, etc., and to a communication unit 209 for exchanging data with other apparatuses via a network such as the Internet. A drive 210 is used to read data from or write data to a recording medium such as a magnetic disk 221, an optical disk 222, a magneto-optical disk 223, or a semiconductor memory 224.

As shown in FIG. 19, the recording medium is implemented by a package media having recorded a program thereon and distributed separately from a personal computer to provide the program to a user, such as a magnetic disk 221 (including a floppy disk), an optical disk 222 (including a CD-ROM (Compact Disk-Read Only Memory)) and a DVD (Digital Versatile Disk)), a magneto-optical disk 223 (including an MD (Mini-Disk)), or a semiconductor memory 224, or by the ROM 202, the hard disk including the storage unit 208, etc. storing a program, which is provided to a user by being embedded in advance in a computer.

Furthermore, in this specification, steps defining a program provided via a medium include, without limitation to processes that are executed in time series according to the described order, processes that are not necessarily executed in time series but executed in parallel or individually.

INDUSTRIAL APPLICABILITY

As described above, according to a data storage apparatus and method and a first program of the present invention, at least one of a first region administered by a first administrator, a second region for administering information relating to a service, a third region, a parent thereof being the first region, for administering information required for forming a region, an upper layer thereof being the first region, that is administered by a second administrator, and a fourth region, a parent thereof being the first region, for administering information required for forming the second region is formed, a key stored in a region that serves as a parent of the region associated with the forming request is read, and encrypted information received is decrypted using the key that has been read. Accordingly, the first administrator is allowed to allocate the first to fourth regions arbitrarily to other administrators.

According to an information processing apparatus and method and a second program of the present invention, information of a second region is encrypted using a key administered by a fourth region when requesting formation of the second region, information of a region administered by a second administrator is encrypted using a key administered by a third region when requesting formation of the region administered by the second administrator to a region administered by a first administrator, information of the third region is encrypted using a key administered by a first region when requesting formation of the third region, and information of the fourth region is encrypted using a key administered by the first region when requesting formation of the fourth region, and the encrypted information is provided to a data storage medium. Accordingly, the first administrator is allowed to arbitrarily permit the second administrator to form the second to fourth regions, and leakage of information to a third party can be prevented.

The invention claimed is:

1. A data storage apparatus for administering regions for storing data in a hierarchical structure, the data storage apparatus comprising:
   a memory, for storing information, wherein the memory comprises:
      a first area definition region configured to define a region to be assigned to a first administrator,
      an area registration service definition region and a service registration service definition region configured to store data for forming a second area definition region, the area registration service definition region and the service registration service definition region being located in a lower layer of the first area definition region,
      the second area definition region configured to define a region to be assigned to a second administrator;
      a service definition region configured to store data for forming the service region;
      wherein the first area definition region is located in an upper layer of the area registration service definition region, the service registration service definition region, and the service definition region, and
      the service region configured to store data relating to a service,
   means for receiving a request for forming one of the first area definition region, the service region, the area registration service definition region, the service registration service definition region, and the service definition region and receiving information relating to the region associated with the forming request, at least a portion of the information being encrypted;
   means for reading a key stored in the memory based on the received information; means for decrypting the encrypted information using the key read by the means for reading, wherein the key is read from an upper region of the region to be formed by referring to the forming request; and
   means for forming the region associated with the forming request in memory based on the decrypted information.

2. A data storage method for administering regions for storing data in a hierarchical structure, the data storage method comprising:
   storing information into a memory, wherein the memory comprises:
      a first area definition region defining a region to be assigned to a first administrator,
      an area registration service definition region and a service registration service definition region storing data for forming a second area definition region, the area registration service definition region and the service registration service definition region being located in a lower layer of the first area definition region, and
      the second area definition region defining a region to be assigned to a second administrator,
      a service definition region storing data for forming a service region,
      the service region storing data relating to a service,
      wherein the first area definition region is located in an upper layer of the area registration service definition region, the service registration service definition region, and the service definition region;
   receiving a request for forming one of the first area definition region, the service region, the area registration service definition region, the service registration service definition region, and the service definition region and receiving information relating to the region associated with the forming request, at least a portion of the information being encrypted;
   reading a key stored in the memory based on the received information;
   decrypting the encrypted information using the key read by the reading means, wherein the key is read from an upper region of the region to be formed by referring to the forming request; and
   forming the region associated with the forming request in the memory based on the decrypted information.

3. A recording medium having recorded thereon a computer-readable program which, when executed by a processor, performs a method for administering regions of a data storage apparatus for storing data in a hierarchical structure, the method comprising:
   storing information into a memory, wherein the memory comprises:
      a first area definition region defining a region to be assigned to a first administrator,
      an area registration service definition region and a service registration service definition region storing data for forming a second area definition region, the area registration service definition region and the service registration service definition region being located in a lower layer of the first area definition region,
      the second area definition region defining a region to be assigned to a second administrator,
      a service definition region storing data for forming the service region;
      the service region storing data relating to a service,
      wherein the first area definition region is located in an upper layer of the area registration service definition region, the service registration service definition region, and the service definition region;
   receiving a request for forming one of the first area definition region, the service region, the area registration service definition region, the service registration service definition region, and the service definition region and receiving information relating to the region associated with the forming request, at least a portion of the information being encrypted;
   reading a key stored in the memory based on the received information;
   decrypting the encrypted information using the key, wherein the key is read from an upper region of the region to be formed by referring to the forming request; and
   forming the region associated with the forming request in the memory based on the decrypted information.

4. An information processing apparatus comprising:
   providing means for providing information to a data storage apparatus for administering regions for storing data in a hierarchical structure, the data storage apparatus comprising:
      a first area definition region defining a region to be assigned to a first administrator,
      an area registration service definition region and a service registration service definition region storing data for forming a second area definition region,
      the second area definition region configured to define a region to be assigned to a second administrator, a service definition region storing data for forming a service region, and the service region storing data relating to a service, wherein the first area definition region being located in an upper layer of the area registration service definition region, the service registration service definition region, and the service definition region, and encryption means for encrypting information of the service region using a key administered by the service definition region when requesting formation of the service region, encrypting information of the second area definition region using a key administered by the area registration service definition region and the service registration service definition region when requesting formation of the second area definition region, encrypting information of the area registration service definition region and the service registration service definition region using a key administered by the area definition region when requesting formation of the area registration service definition region and the service registration service definition region, and encrypting information of the service definition region using a key administered by the first area definition region when requesting formation of the service definition region.

5. An information processing method for an information processing apparatus comprising:

providing information to a data storage apparatus for administering regions for storing data in a hierarchical structure, the data storage apparatus comprising:

a first area definition region defining a region to be assigned to a first administrator, an area registration service definition region and a service registration service definition region storing data for forming a second area definition region, the second area definition region configured to define a region to be assigned to a second administrator, a service definition region storing data for forming a service region, and the service region storing data relating to a service, wherein the first area definition region being located in an upper layer of the area registration service definition region, the service registration service definition region, and the service definition region;

encrypting information of the service region using a key administered by the service definition region when requesting formation of the service region;

encrypting information of the second area definition region using a key administered by the area registration service definition region and the service registration service definition region when requesting formation of the second area definition region;

encrypting information of the area registration service definition region and the" service registration service definition region using a key administered by the area definition region when requesting formation of the area registration service definition region and the service registration service definition region; and encrypting information of the service definition region using a key administered by the first area definition region when requesting formation of the service definition region.

6. A recording medium having recorded thereon a computer-readable program which, when executed by a processor, performs a method comprising:

providing information to a data storage apparatus for administering regions of an information processing apparatus for storing data in a hierarchical structure, the data storage apparatus comprising:

a first area definition region defining a region to be assigned to a first administrator, an area registration service definition region and a service registration service definition region storing data for forming a second area definition region the second area definition region configured to define a region to be assigned to a second administrator, a service definition region storing data for forming the service region, and the service region storing data relating to a service, wherein the first area definition region is located in an upper layer of the area registration service definition region, the service registration service definition region, and the service definition region, encrypting information of the service region using a key administered by the service definition region when requesting formation of the service region;

encrypting information of the second area definition region using a key administered by the area registration service definition region and the service registration service definition region when requesting formation of the second area definition region;

encrypting information of the area registration service definition region and the service registration service definition region using a key administered by the area definition region when requesting formation of the area registration service definition region and the service registration service definition region; and encrypting information of the service definition region using a key administered by the first area definition region when requesting formation of the service definition region.

* * * * *

UNITED STATES PATENT AND TRADEMARK OFFICE
CERTIFICATE OF CORRECTION

PATENT NO. : 7,376,973 B2
APPLICATION NO. : 10/296124
DATED : May 20, 2008
INVENTOR(S) : Kusakabe et al.

It is certified that error appears in the above-identified patent and that said Letters Patent is hereby corrected as shown below:

Column 25, lines 18-19, "region, the" should read --region, and the--.

Column 25, line 19, "region configured" should read --region being configured--.

Column 25, line 20, "administrator;" should read --administrator, and--.

Column 25, line 22, "forming the service" should read --forming a service--.

Column 25, line 22, "region;" should read --region, the service region being configured to store data relating to a service,--.

Column 25, line 26, "definition region, and" should read --definition region;--.

Column 25, delete lines 27 and 28 in their entirety.

Column 25, line 60, "administrator," should read --administrator, and--.

Column 26, lines 31-32, "region, the" should read --region, and the--.

Column 26, line 33, "administrator," should read --administrator, and--.

Column 26, line 34, "the" should read --a--.

Column 26, lines 35-36, "region; the" should read --region, the--.

UNITED STATES PATENT AND TRADEMARK OFFICE
CERTIFICATE OF CORRECTION

PATENT NO. : 7,376,973 B2
APPLICATION NO. : 10/296124
DATED : May 20, 2008
INVENTOR(S) : Kusakabe et al.

It is certified that error appears in the above-identified patent and that said Letters Patent is hereby corrected as shown below:

Column 26, line 66, "region configured" should read --region being configured--.

Signed and Sealed this

Fifth Day of August, 2008

JON W. DUDAS
*Director of the United States Patent and Trademark Office*